US012204866B1

(12) United States Patent
Atluri et al.

(10) Patent No.: US 12,204,866 B1
(45) Date of Patent: Jan. 21, 2025

(54) VOICE BASED SEARCHING AND DIALOG MANAGEMENT SYSTEM

(71) Applicant: Amazon Technologies, Inc., Seattle, WA (US)

(72) Inventors: Srinivasa Sandeep Atluri, Seattle, WA (US); Constantin Daniel Marcu, Rolling Hills, CA (US); Kevin Small, Seattle, WA (US); Kemal Oral Cansizlar, Seattle, WA (US); Vijit Singh, Seattle, WA (US); Li Zhou, Seattle, WA (US); Aritra Biswas, Seattle, WA (US); Bhanu Pratap Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/472,203

(22) Filed: Sep. 10, 2021

(51) Int. Cl.
| | |
|---|---|
| *G06F 40/35* | (2020.01) |
| *G06F 16/632* | (2019.01) |
| *G10L 13/08* | (2013.01) |
| *G10L 15/18* | (2013.01) |

(52) U.S. Cl.
CPC ............ *G06F 40/35* (2020.01); *G06F 16/632* (2019.01); *G10L 13/08* (2013.01); *G10L 15/18* (2013.01)

(58) Field of Classification Search
CPC ....... G06F 40/35; G06F 16/632; G10L 13/08; G10L 15/18
See application file for complete search history.

(56) References Cited

U.S. PATENT DOCUMENTS

| | | | |
|---|---|---|---|
| 9,305,090 B1* | 4/2016 | Hotchkies | G06F 16/3322 |
| 2009/0094221 A1* | 4/2009 | Cameron | G06F 16/3322 |
| | | | 707/999.005 |
| 2009/0215476 A1* | 8/2009 | Tysowski | H04L 51/04 |
| | | | 455/466 |
| 2014/0380145 A1* | 12/2014 | Wilsher | H04L 51/18 |
| | | | 715/234 |

(Continued)

OTHER PUBLICATIONS

Hashemi, Seyyed Hadi, et al. "Impact of domain and user's learning phase on task and session identification in smart speaker intelligent assistants." Proceedings of the 27th ACM International Conference on Information and Knowledge Management. 2018. pp. 1193-1202 (Year: 2018).*

(Continued)

*Primary Examiner* — Jesse S Pullias
*Assistant Examiner* — Michael C. Lee
(74) *Attorney, Agent, or Firm* — Pierce Atwood LLP

(57) ABSTRACT

Techniques for conversational-based searching are described. A system may receive a first spoken user input, and may determine that the first spoken user input corresponds to a request for information associated with an entity. The system may retrieve item results corresponding to the entity. The system may determine a suggested user input based on the retrieved item results, and may determine output data corresponding to the suggested user input. The system may send output data to a user device, where the output data includes the item results and the suggested user input. The system may receive a second spoken user input, and may determine that the second spoken user input corresponds to the suggested user input. In response, the system may send the previously determined output data to the device.

20 Claims, 13 Drawing Sheets

(56) References Cited

U.S. PATENT DOCUMENTS

| | | | |
|---|---|---|---|
| 2015/0254057 A1* | 9/2015 | Klein | H04N 21/4668 |
| | | | 704/275 |
| 2015/0382047 A1* | 12/2015 | Van Os | H04N 21/25891 |
| | | | 725/38 |
| 2017/0358302 A1* | 12/2017 | Orr | G10L 15/22 |
| 2018/0052842 A1* | 2/2018 | Hewavitharana | G06F 40/30 |
| 2018/0336894 A1* | 11/2018 | Graham | G06F 9/453 |
| 2019/0147880 A1* | 5/2019 | Booker | G06F 3/167 |
| | | | 704/251 |
| 2019/0311375 A1* | 10/2019 | Sapoznik | G06Q 30/016 |
| 2020/0027456 A1* | 1/2020 | Kim | G10L 15/1815 |
| 2020/0042649 A1* | 2/2020 | Bakis | H04L 51/02 |
| 2020/0279556 A1* | 9/2020 | Gruber | G06F 40/30 |
| 2020/0293274 A1* | 9/2020 | Dontcheva | G06F 9/453 |
| 2020/0374243 A1* | 11/2020 | Jina | H04L 51/02 |
| 2020/0380973 A1* | 12/2020 | Novitchenko | G06F 40/35 |
| 2020/0401638 A1* | 12/2020 | Galimovich | G06F 16/90324 |
| 2021/0104232 A1* | 4/2021 | Lee | G06N 3/08 |
| 2022/0188361 A1* | 6/2022 | Botros | G10L 15/16 |
| 2023/0022515 A1* | 1/2023 | Aher | G10L 15/02 |

OTHER PUBLICATIONS

Dalton, Jeffrey, Victor Ajayi, and Richard Main. "Vote goat: Conversational movie recommendation." The 41st international acm sigir conference on research & development in information retrieval. 2018. pp. 1285-1288 (Year: 2018).*

Singh, Abhishek, et al. "Introduction to microsoft Bot, RASA, and google dialogflow." Building an Enterprise Chatbot. Apress, Berkeley, CA, 2019. pp. 281-302 (Year: 2019).*

Trippas, Johanne R., et al. "Towards a model for spoken conversational search." Information Processing & Management 57.2 (Nov. 5, 2019), pp. 1-19 (Year: 2019).*

* cited by examiner

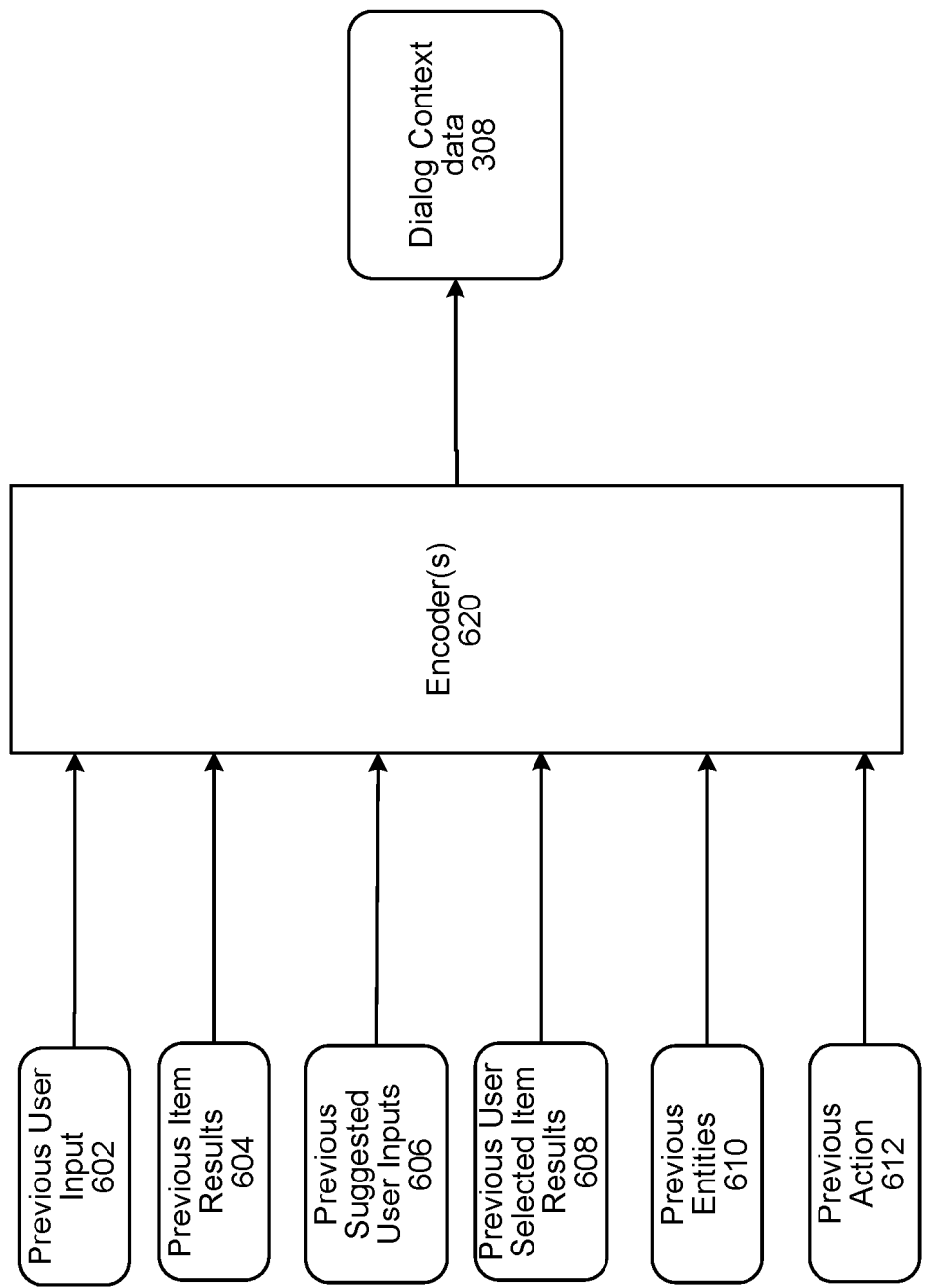

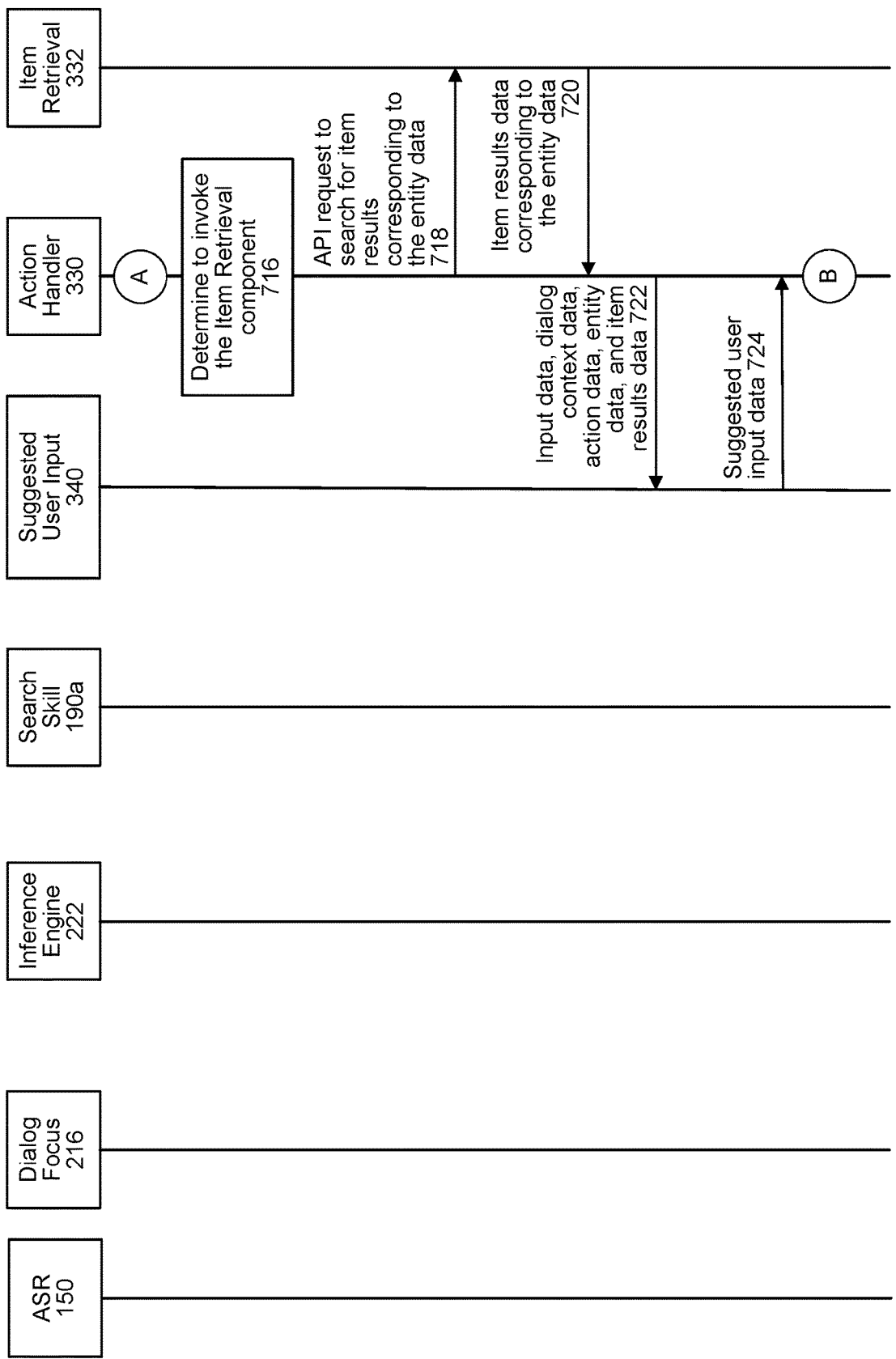

VOICE BASED SEARCHING AND DIALOG MANAGEMENT SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 is a conceptual diagram illustrating data that may be processed by an inference engine of the dialog management component, according to embodiments of the present disclosure.

FIGS. 7A-7C are signal flow diagrams illustrating processing that may be performed by the system, according to the embodiments of the present disclosure.

DETAILED DESCRIPTION

Figure 1:
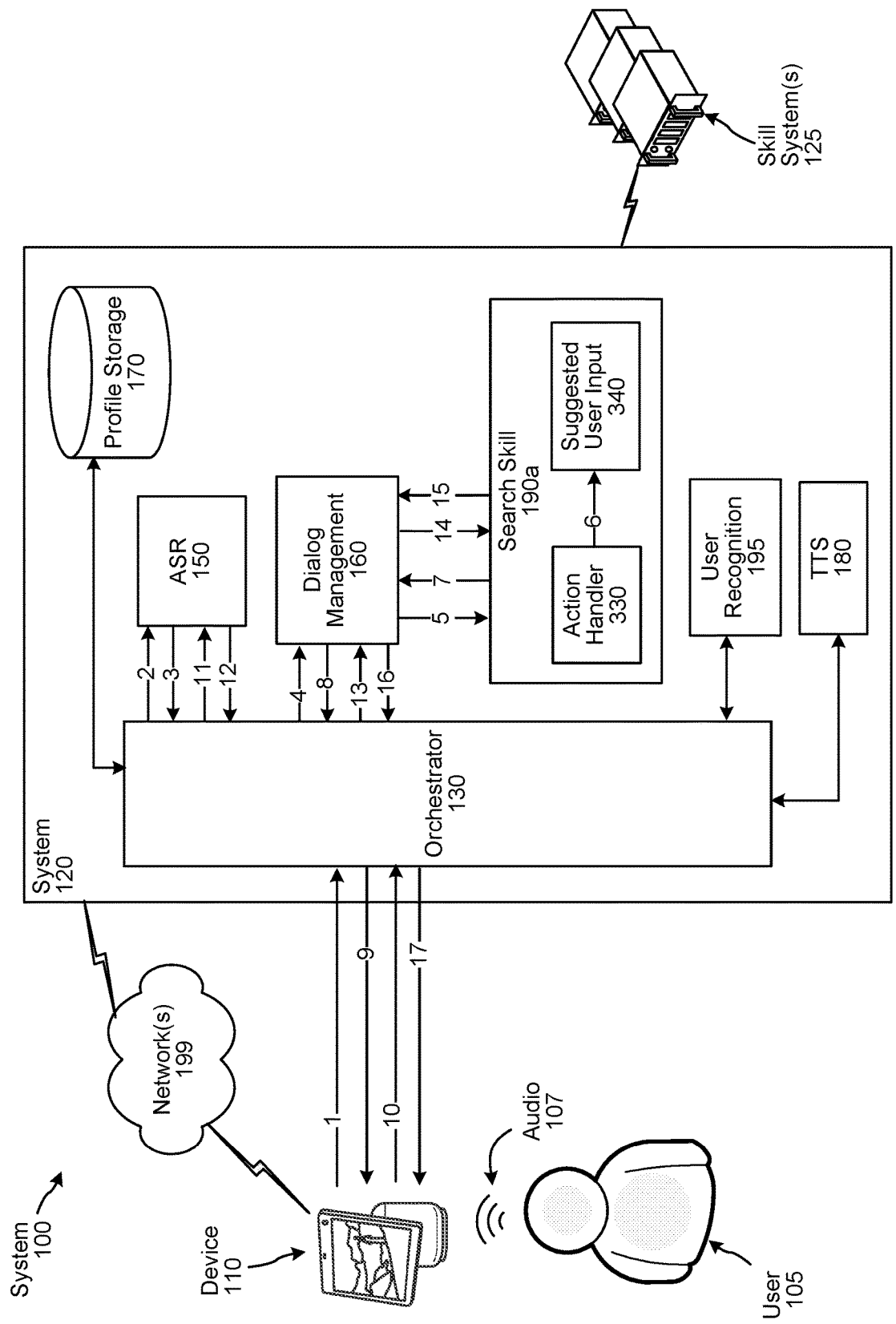
FIG. 1 is a conceptual diagram illustrating an example system for outputting a suggested user input along with search results in response to a user input, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems often need to retain, recognize, revaluate, and use information collected during more than one input during a back-and-forth or "multi-turn" interaction with the user.

The system may be configured to respond to the user across multiple exchanges between the user and the system. For example, the user may say to the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play when the system does not directly specify a song to be played). Alternatively, a dialog may not be goal-oriented, for example appearing more like a freeform conversation between the system and a user seemingly without a definite end point or action in mind at least when the conversation begins. System components that control what actions the system takes in response to various user inputs of a dialog may sometimes be referred to as chatbots.

The present disclosure relates to techniques for enabling a conversational search and browsing experience for a user, where the user may search and explore items or topics of interest using a multi-modal interface and a multi-turn dialog exchange. A system of the present disclosure can receive a spoken input from a user, respond to the spoken input by displaying search results, and receive a further spoken input interacting with the displayed search results.

The system of the present disclosure determines and presents suggested user inputs to facilitate interactions between the user and the system. For example, a user may say "find gifts for mom," and the system may cause a user device to display search results showing items that may be appropriate as gifts. Along with the search results, the system may also cause the user device to display a suggested user input and/or output synthesized speech representing the suggested user input, such as, "you can say 'show me gifts under $25.'"

A suggested user input may be based on the search results corresponding to the user input. For example, a subset of the search results may correspond to a particular attribute (e.g., a price range), and the suggested user input may be based on the particular attribute (e.g., "show me gifts under $25"). As another example, the search results may include information relating to an entity other than the entity corresponding to the user input, and the suggested user input may be based on the other entity (e.g., the user input may be "what's happening in California" and the suggested user input may be "try saying 'tell me more about Sacramento'").

The system may determine and store output data corresponding to the suggested user input. If another user input during the dialog corresponds to the suggested user input, the system may output the stored output data.

A user input and performance by the system of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience.

As used herein, a "skill" may refer to software, that may be placed on a machine or a virtual machine (e.g., software that may be launched in a virtual instance when called), configured to perform one or more actions that are responsive to a user input. What is referred to herein as a skill may sometimes be referred to as an application, bot, action, or the like.

A "domain" may include various skills of related functionalities. For example, a music domain may include various skills that can respond to a user's request to play music, enable a user to purchase music, etc. In another example, a smart-home domain may include skills that enable a user to control various home devices. Example domains may be a shopping domain, a music domain, a smart-home domain, a news domain, etc.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 is a conceptual diagram illustrating an example system 100 for outputting a suggested user input along with search results in response to a user input. As shown in FIG. 1, the system 100 may include a device 110, local to a user 105, connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech-based dialog management system configured to process spoken natural language inputs using ASR processing. The system 120 may include multiple components to facilitate speech processing, such as, an orchestrator component 130, an ASR component 150, a dialog management component 160, and a search skill component 190a. The system 120 may include other skill components 190 which may be in communication with a skill system(s) 125 external to the system 120. The system 120 may also include a profile storage 170, a TTS component 180, and a user recognition component 195 to facilitate processing of users inputs and generating outputs.

Referring to FIG. 1, the user 105 may speak an input, and the device 110 may capture audio 107 representing the spoken user input. For example, the user 105 may say "Show me gifts for mom" or "What is happening in California right now?" In other examples, the user 105 may provide another type of input (e.g., selection of a button, selection of displayed graphical interface elements, may perform a gesture, etc.). The device 110 may send (step 1) audio data (or other type of input data, such as, image data, text data, etc.) corresponding to the user input to the system 120 for processing.

The orchestrator component 130 may receive the input data from the device 110. In the case that the input data is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the dialog management component 160. When the input data is other than audio data, the orchestrator component 130 may send the input data to the dialog management component 160 or another component (not shown) for processing. The dialog management component 160 may associate the ASR data (or other input data) with a dialog session identifier to track user inputs and system responses for the current dialog session. The dialog management component 160 may also store the ASR data (or other input data) as dialog context data for the current dialog session.

The dialog management component 160 may process the ASR data (or other input data) to determine an action to be performed in response to the user input as described in detail below in relation to FIG. 2. Using one or more dialog models (e.g., dialog models 214), the dialog management component 160 may determine that the search skill component 190a is to be invoked to respond to the user input. The dialog models 214 may represent user inputs that correspond to the search skill component 190a. For example, the dialog models 214 may indicate that user inputs such as "What is happening in/with . . . ", "What is . . . ", "Show me . . . ", "I want to find . . . ", "Search for . . . ", etc. may correspond to the search skill component 190a. User inputs that request information may correspond to the search skill component 190a. Based on determining that the search skill component 190a is to be invoked, the dialog management component 160 may send (step 5) a command to the search skill component 190a to execute. In some embodiments, the dialog management component 160 may send an API request (e.g., invoke ( )) to the search skill component 190a.

The search skill component 190a may include at least an action handler component 330 and a suggested user input component 340, which are described in further detail below in relation to FIGS. 3-5. The search skill component 190a may process the ASR data and determine an action to be performed in response to the user input. The action handler component 330 may determine to search one or more data sources for information relating to an entity included in the user input. For example, for the user input "show me gifts for mom," the action handler component 330 may determine to search a retail catalog for products. As another example, for the user input "what is happening in California," the action handler component 330 may determine to search news articles. As described below in relation to FIG. 3, the action handler component 330 may invoke one or more components to retrieve item results corresponding to the information requested in the user input. The action handler component 330 may determine which of the retrieved item results are to be present to the user 105. Such determination may be based on user profile data associated with the user 105.

The search skill component 190a may send (step 6) the item results, to be presented to the user 105, to the suggested user input component 340. The suggested user input component 340 may determine one or more suggested user inputs to present to the user 105 along with the item results. In some embodiments, the suggested user input component 340 may additionally or alternatively determine one or more suggested entities to present to the user 105 along with the item results. The suggested user input(s) and the suggested entity(ies) may be based on the item results. The suggested user inputs and the suggested entities may be presented to the user 105 to enable the user 105 to explore the item results further, to explore related entities, or to explore another area of interest.

The suggested user input component 340 may process the item results to determine one or more attributes corresponding to the item results. For example, the item results may include products corresponding to a particular price range, a particular feature, a particular shipping cost, etc. Using the determined attributes, the suggested user input component 340 may determine the suggested user inputs. For example, the suggested user input may be "you can say 'show me gifts under $25'", "you can say 'show me items with a stainless steel tub'", "you can try 'items that ship for free'", etc.

The suggested user input component 340 may process the item results to determine one or more entities represented in the item results. For example, for the user input "what is happening in California?", the item results may include various news articles, and the news articles may refer to a particular a person (e.g., mayor), a particular weather event (e.g., an earthquake), a particular place (e.g., city hall), etc. Using the determined entities represented in the news articles, the suggested user input may be "try saying 'show me news about the [mayor]'", "you can say 'show me information about the [earthquake]'", "try 'what is happening at the [city hall]'", etc. Alternatively, the suggested entities may be [mayor], [earthquake], [city hall], etc.

The suggested user input component 340 may process the item results to determine an answer represented in the item results, and may formulate a question for the answer. The formulated question may be presented as the suggested user input. For example, the item results may include products and related information, such as, product descriptions, product reviews, etc. The suggested user input component 340 may determine that the product description for a particular product provides information on how to use the product. Based on this, the suggested user input component 340 may determine the suggested user input to be "to learn more, say 'tell me how to use this'." As another example, a product review for another product may describe the product as being good for a particular use. Based on this the suggested user input may be "try 'is this [product] good for [use].'"

The suggested user input component 340 may use summarization techniques to generate one or more summaries corresponding to the information represented in the item results. One or more summarization techniques used by the components described herein may involve using machine learning models, such as, an encoder-decoder architecture, a neural network, a sequential-based summary generation, etc. One or more summarization techniques may involve extracting/copying words from input documents to generate the summary. One or more summarization techniques may involve generating summaries that include original words rather than copying words from the input documents. One or more summarization techniques may involve generating summaries corresponding to particular context (e.g., an entity, a question, a query, etc.).

Using the summaries, the suggested user input component 340 may determine a suggested user input. For example, the item results may include news articles related to a current weather event in California, and the suggested user input component 340 may generate a summary of information related to the weather event. The suggested user input, in this case, may be "try saying 'tell me more about the [weather event]'".

The search skill component 190a may determine output data corresponding to the suggested user input(s) or suggested entity(ies). For example, if the suggested user input is "try 'show me more gifts under $25'", then the search skill component 190a may determine one or more products that are less than $25, and may store the output data for later presentation in case the user 105 provides the suggested user input.

The search skill component 190a may determine system response data, corresponding to the user input, to include the item results and the suggested user input(s) or the suggested entity(ies). The search skill component 190a may send (step 7) the system response data to the dialog management component 160.

The dialog management component 160 may send (step 8), to the orchestrator component 130, output data, which may be based on the system response data received from the search skill component 190a. In some cases the output data may be the system response data. In other cases, the dialog management component 160 may use some natural language generation techniques (e.g., using a natural language generation component 240 shown in FIG. 2) to determine the output data based on the system response data. In some cases, the output data may be a natural language output informing the user 105 of performance the requested action.

The orchestrator component 130 may determine and send (step 9) a command to the device 110 that causes the device 110 to output the system response data. Based on receiving the command, the device 110 may present the item results and the suggested user input(s) to the user 105. In some embodiments, the item results and the suggested user input(s) may be displayed at the device 110. The device 110 may additionally output synthesized speech presenting the item results and/or the suggested user input(s). For example, the device 110 may output "I found these items. Try saying 'show me gifts under $25.'"

After the device 110 outputs the system response data, the user 105 may provide a second user input (e.g., corresponding to a suggested user input). For example, the user 105 may say "show me gifts under $25". The device 110 may capture audio corresponding to the spoken input, and may send (step 10) corresponding audio data to the system 120 for processing. The orchestrator component 130 may send (step 11) the audio data to the ASR component 150, the ASR component 150 may process to determine ASR data corresponding to the second user input, and the ASR component 150 may send (step 12) the ASR data to the orchestrator component 130. Alternatively, the user 105 may provide an input other than a spoken input. For example, the user 105 may select, via a touch input, the representation of the suggested user input displayed at the device 110. As another example, the user 105 may perform a gesture (e.g., nod head, thumbs up, wave hand, etc.) selecting the suggested user input. The device 110 may send (at step 10) input data corresponding to the user input (e.g., the touch input, the gesture input, etc.).

The orchestrator component 130 may send (step 13) the ASR data, corresponding to the second user input to the dialog management component 160. The dialog management component 160 may associate the dialog session identifier for the current dialog session (i.e., corresponding to the user input received at step 1 and output data sent at step 9) with the ASR data. Based on the search skill component 190a being in focus (i.e. being invoked for the first user input of the current dialog session), the dialog management component 160 may invoke the search skill component 190a to respond to the second user input. The dialog management component 160 may send (step 14) a command (or an API request) to the search skill component 190a, along with the ASR data corresponding to the second user input.

The search skill component 190a may determine that the second user input corresponds to a suggested user input presented in response to the first user input. In response to the second user input corresponding to the suggested user input, the search skill component 190a may send (step 15) the previously determined and stored output data, corresponding to the suggested user input, to the dialog management component 160. For example, the previously determined and stored output data may be item results for products less than $25.

In some embodiments, the suggested user input component 340 may determine one or more additional suggested user inputs to be presented along with the output data responsive to the second user input. The search skill component 190a may also send the additional suggested user input(s) to the dialog management component 160 for presentation to the user 105.

The dialog management component 160 may send (step 16) the output data responsive to the user input (and the additional suggested user input(s), if applicable), to the orchestrator component 130. In turn, the orchestrator component 130 may send (step 17) a command to the device 110, along with the output data, to cause the device 110 to present the item results corresponding to the second user input.

In this manner, the system 100 may determine item results corresponding to information requested by the user 105, determine a suggested user input based on the item results, determine and store output data responsive to the suggested user input, and output the previously determined and stored output data in response to the user 105 providing the suggested user input.

Figure 2:
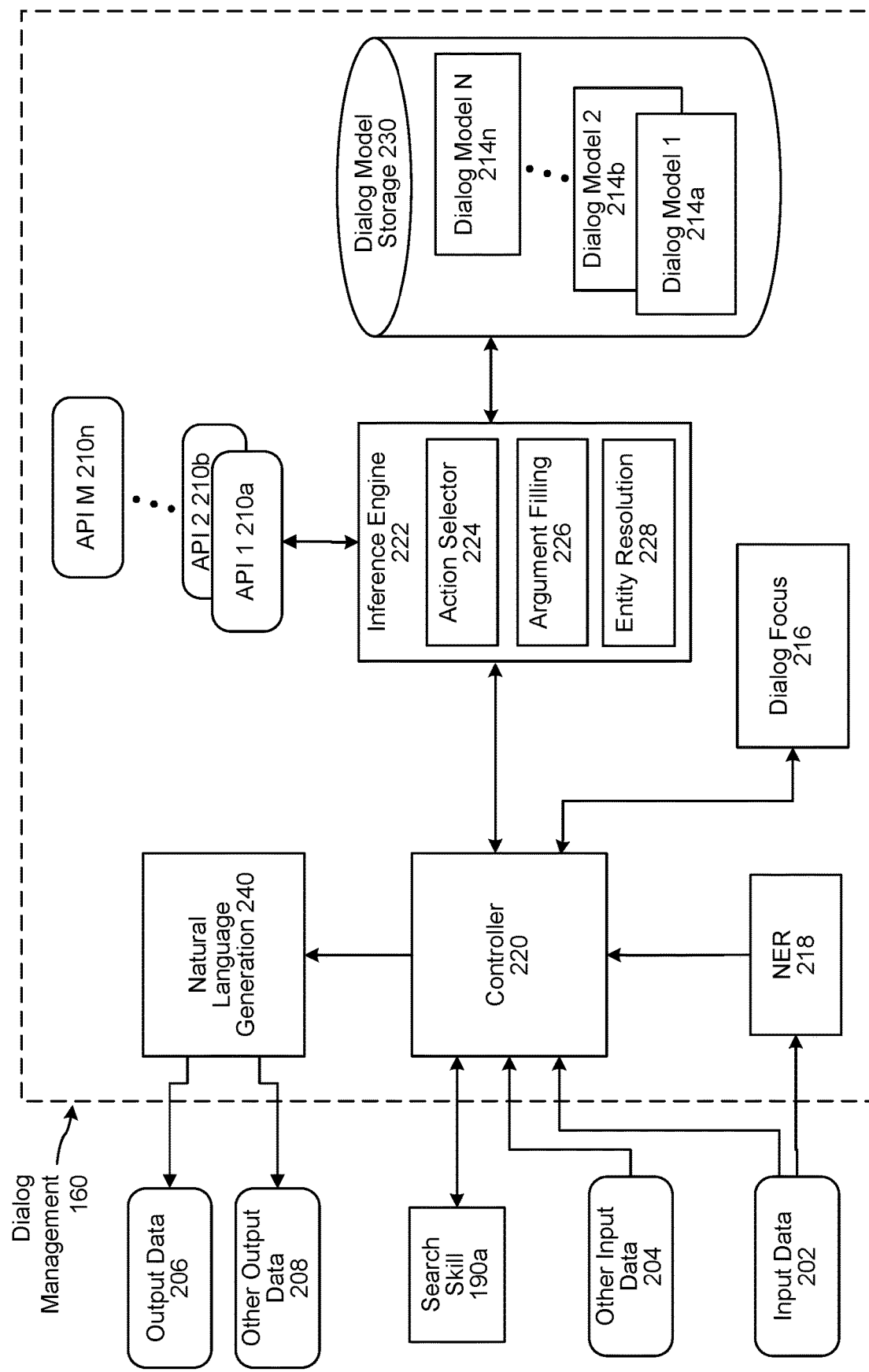
FIG. 2 is a conceptual diagram illustrating an example dialog management component, according to embodiments of the present disclosure.

FIG. 2 is a conceptual diagram illustrating example components of the dialog management component 160, according to embodiments of the present disclosure. The dialog management component 160 may be configured to determine dialog context data for the current dialog session, determine an action to be performed based on the dialog context data and the user input data, determine a system response to the user input based on the action and the dialog context data, convert the determined system response into a form expected by the user or beneficial to the user, and update the dialog context data for the current dialog session. The dialog management component may include an NER component 218, a controller component 220, an inference engine 222, a dialog focus component 216, and a natural language generation (NLG) component 240.

The dialog management component 160 receives input data 202. The input data 202 may include text data, token data, or ASR output data (one or more ASR hypotheses, each including text data or token data, and a corresponding confidence score) corresponding to a user input provided by the user 105. The input data 202 may be data representing words, instructions, markup language, speech, or gestures, or may be a vector or other representation of the same. The input data 202 may be generated by a user via a keyboard, touchscreen, microphone, camera, or other such input device associated with the device 110. In other embodiments, the input data 202 is generated by the ASR component 150, as described herein, from audio data corresponding to a spoken input received from the user 105.

The dialog management component 160 may receive other input data 204, which includes data indicating further information about the user input, such as the profile identifier for the user 105, an emotional state of the user, device information for the device 110, etc.

As described in greater detail below, using the input data 202 and/or other input data 204, the dialog management component 160 may determine output data 206 and/or other output data 208. The dialog management component 160 may instead or additionally perform an action based on the input data 202 and/or other input data 204, for example, by calling one or more APIs 210.

The dialog management component 160 may include a Named Entity Recognition (NER) component 218. The NER component 218 may process the ASR data to determine one or more entities corresponding to the user input. The NER component 218 may determine and output entity data, which may include portions of the user input tagged as corresponding to an entity, and may also include an entity type. For example, for the user input "play [song name] by [artist]," the NER component 218 may determine the following entity data: {<Verb>: "Play"; <SongName>: "[song name]"; <Artist>: "[artist]"}. The NER component 218 may perform NER processing to identify words in the input data 202, which may be ASR output data or text data, as subject, object, verb, preposition, etc. based on grammar rules and/or machine learning models. The NER processing may then involve searching corresponding fields in a lexicon, attempting to match words and phrases in the input data 202, that NER processing tagged as a grammatical object or object modifier, with those identified in the lexicon.

NER processing may include semantic tagging, which is the labeling of a word or combination of words according to their type/semantic meaning. NER processing may include parsing the input data 202 using heuristic grammar rules, or a model that may be constructed using techniques such as hidden Markov models, maximum entropy models, log linear models, conditional random fields (CRFs), and the like. For example, NER processing of a user input "play [song name] by the [artist]" may determine {Verb}: "Play," {Object}: "[song name]," {Object Preposition}: "by," and {Object Modifier}: "the [artist]."

In some embodiments, the NER component 218 may identify the words in the input data 202 based on a skill component 190 that is in focus for the dialog session. For example, the NER component 218 may identify "Play" as a verb based on a word database associated with a music skill component, when the music skill component is the skill component that most recently processed with respect to the dialog session.

An output of the NER component 218 may be entity data including one or more words from the input data 202, each word tagged with an entity type (e.g., verb, object, subject, etc.).

The NER component 218 may include a ranker component. The ranker component may assign a particular confidence score to each entity data outputted. The confidence score of the entity data may represent a confidence of the NER component 218 in the processing performed with respect to the input data 202. The confidence score of a particular entity data may be affected by whether there are unfilled slots (unidentified words from the input data 202).

The controller component 220 may be configured to manage requests and data for the dialog management component 160. The controller component 220 may receive the other input data 204, and may send the other input data 204 to the dialog focus component 216, the inference engine 222, and/or the NLG component 240 for processing.

In some embodiments, a single NER component 218 may be used for multiple different groups of skills (e.g., different domains of skills) (i.e., a "cross-domain" NER component 218). In other embodiments, a different NER component 218 may be used for each different group of skills (different domains). One or more candidate skills corresponding to the input data 212 may be determined and NER components 218 corresponding to the candidate skills may be used to process the input data 202. A dialog focus component 216 may store the output entities from each candidate skill NER component and may remove unselected entities when a dialog model 214 is selected.

The controller component 220 may send the entity data from the NER component 218 to the dialog focus component 216.

The dialog focus component 216 that may store context data relating to a dialog session that can be used to determine a system response to a user input. The dialog focus component 216 may store dialog state data corresponding to dialog history data, action history data, and/or other data. The dialog history data may correspond to one or more user inputs provided by the user 105 during the current dialog session, and one or more system responses generated in response to the user inputs. The dialog history data may be text data, token data, or ASR data for the user inputs, and may be text data or other natural language data for the system responses. The action history data may correspond to one or more actions (as determined by the action selector 224) performed in response to the user inputs for the current dialog session. The action history data may include an identifier for the API 210 called to perform the action, the data inputted to the API 210, and the data outputted by the API 210. The dialog state data may be stored for each turn of the dialog session and may be identified by a turn number, so that the order in which the user inputs are received and the system responses are generated is known. The dialog state data may also include a skill identifier for the skill component 190 that may be invoked to generate the system response.

The dialog focus component 216 may store graph-based dialog state data including a plurality of graph nodes; each graph node may correspond to an item of state data, such as an entity type, entity value, prior API call, and/or user data. The other components, such as the inference engine 222, may access all of the graph nodes or may access only a subset of the graph nodes. The dialog focus component 216 may use any type of storage mechanism and may serve as long-term and/or short term memory for the dialog management component 160, thus enabling tracking of entities, ASR output data, TTS output data, and other features at each turn of a dialog. In some embodiments, the dialog focus component 216 may be updated after each turn of dialog with updated dialog state data.

The dialog focus component 216 may store data relevant to a dialog session. In various embodiments, the dialog focus component 216 stores the input data 202, other input data 204, entity data from the NER component 218, action data, and/or response data. The dialog focus component 216 may further store additional information, such as location data, user preference data, and environment data. In various embodiments, the dialog focus component 216 uses an encoder to encode some or all of the received data into one or more feature vectors and a decoder to determine, based on the feature vectors, goal data corresponding to a dialog goal of a user.

The controller component 220 may send data from the dialog focus component 216, the entity data from the NER component 218, the input data 202, and/or the other input data 204 to the inference engine 222 for processing. The inference engine 222, in some embodiments, may include an action selector component 224, which is configured to predict an action responsive to a user input, and an argument filling component 226, which is configured to determine data usable to perform the predicted action. In other embodiments, the inference engine 222 may include a single component for predicting the action and for determining the data needed to perform the predicted action.

The action selector component 224 processes the current dialog context and predicts the next action type and action name to run. The three action types, that action selector component 224 may predict from in some embodiments, are as follows: (1) API-which causes invocation of an API associated with the skill component; (2) Response-which causes output of a natural language response to the user (for example, inform of a transaction result or request more information), and (3) System-which causes the dialog management component 160 to wait for the next user input. This action type is an internal/system action to indicate all tasks have run.

The action name can be an API definition name or a response name. The inference engine 222 may run the action selector component 224 multiple times in a single turn until it predicts the System action type.

For example, a skill component may be configured to book movie tickets and may be associated with an API name "FindShowtimes", which has an argument, <title>, of type <MovieTitle>. The user 105 may say "Find showtimes for the [movie]." In this example, the action selector component 224 may run three times with respect to the user input. The first run may predict the API action type with name "Find-Showtimes" and may invoke the API. The second run may predict the Response action type with name "InformMovieShowtimes" and may render the corresponding response. The third run may predict the System action type, which terminates action prediction processing by the action selector component 224.

In some embodiments, the action selector component 224 may process (at least) the input data 202 and the data from the dialog focus component 216 using one or more dialog models 214 stored at a dialog model storage 230. The action selector component 224 may select one or more dialog models 214, from the dialog model storage 230, for further processing of the input data 202. Each dialog model 214 may be associated with one or more categories of functions. Each dialog model 214 may correspond to a sample dialog flow including sample user inputs and sample system responses to the user inputs. The sample system responses may be natural language outputs, API calls, or both.

The action selector component 224 may be a trained model, such as a classifier. In some embodiments, the action selector component 224 generates an N-best list of dialog models including two or more of the dialog models 214 for further processing. The action selector component 224 may create the N-best list by determining a score for each dialog model 214 given the data stored at the dialog focus component 216 and the input data 202. The dialog model 214 may include a corresponding goal type (e.g., play music, reserve a taxi, book a flight, etc.), one or more corresponding APIs, one or more corresponding system responses, and/or one or more entities corresponding to the goal type. The action selector component 224 may, for example, determine a score, for a dialog model 214, based on a presence or absence of one or more entities determined by the NER component 218 in the dialog model 214. Presence of an entity in a list of entities corresponding to a dialog model 214 may, for example, result in a higher score for the dialog model 214. The action selector component 224 may send the input data 202 to the dialog models 214 having the N-highest scores. In other embodiments, the action selector component 224 sends the input data 202 to the dialog models 214 having scores greater than a threshold. The threshold may be a numerical value or the number N of dialog models 214 to be selected.

In some embodiments, the action selector component 224 may select the dialog model 214 with the highest score for further processing. The action selector component 214 may process the input data 202 and the data from the dialog focus component 216 using the selected dialog model 214. Such processing may result in determining an action to be performed in response to the user input corresponding to the input data 202. The action may be calling one or more APIs 210. For example, an API 210 configured to reserve a taxi may be called. The action may be outputting a natural language output, for example, to confirm performance of the action, to solicit additional data needed to perform the action, etc.

The argument filling component 226 may be configured to determine one or more types of data needed to perform the action determined by the action selector component 224. For example, the argument filling component 226 may determine which arguments are needed to call an API 210 (e.g., pick-up location, drop-off location, pick-up time, etc.), corresponding to the determined action. The argument filling component 226 may also determine whether the types of data needed are available at/known to the dialog management component 160. To make this determination, the argument filling component 226 may use the entity data generated by the NER component 218 and the data from the dialog focus component 216. For example, the user 105 may have mentioned one or more of the pick-up location, the drop-off location or the time in the instant user input (corresponding to the input data 202) or in the previous user inputs of the dialog session.

The argument filling component 226 fills action arguments with entities from the dialog context. An entity may be a slot the user mentioned in a user input or may be return values from previous invoked APIs in the dialog session.

When the action selector component 224 predicts an API action or a Response action, the next step is to determine how to fill the arguments with entities. The argument filling component 226 may use dialog context, stored at the dialog focus component 216, to access all available entities for the dialog session. The argument filling component 226 supports contextual carryover as it considers entities mentioned by the user 105 and entities outputted by APIs across the entire dialog session. The argument filling component 226 then selects the most likely entities to fill arguments (of the same type as the entities), which the inference engine 222 then uses when invoking actions.

For example, a skill component may be associated with an API definition "FindShowtimes", which has an argument, <title>, of type <MovieTitle>, and returns entity type <ShowTimeInfo>, which has properties <time> (entity type <Time>) and <theaterName> (entity type <TheaterName>). The user 105 may say "Find showtimes for the [movie]"

The NER component 218, in this example, may output entity data: {<MovieTitle>: "[movie]"}. The entity data may be stored in the dialog focus component 216. After the action selector component 224 predicts the API action with name "FindShowTimes", the argument filling component 226 may use {<MovieTitle>: "[movie]"} to fill the <title> argument of the "FindShowTimes" API, and the inference engine 222 then invokes the API. On the next run, the action selector component 224 may predict the Response action type with name "InformMovieShowtimes" associated with a <time> argument and a <theaterName> argument, and the argument filling component 226 may fill the arguments using the <time> entity and the <theaterName> entity returned by the "FindShowTimes" API.

In some embodiments, the argument filling component 226 may determine that one or more types of data needed to call an API 210 are not available/known to the dialog management component 160. In such cases, the inference engine 222 may determine to generate a natural language output requesting the missing data from the user 105.

In some embodiments, the argument filling component 226 may determine a confidence score for the data corresponding to a type of data needed to call an API 210. If the confidence score for the data is below a threshold value (i.e. the argument filling component 226 is not confident that the data corresponds to the type of data), then the inference engine 222 may generate a natural language output confirming use of the data to perform the action. For example, the system may output synthesized speech "Do you want a taxi to pick you up from [location]," where [location] may be derived from the entity data corresponding to the input data 202 or from the data stored at the dialog focus component 216.

If the argument filling component 226 determines that two pieces of data may correspond to the type of data (e.g., based on similar or same confidence scores), then the inference engine 222 may generate a natural language output requesting the user 105 to select one of the two pieces of data. For example, the system may output synthesized speech "Do you want a taxi to pick you up from [first location] or [second location]," where [first location] may be derived from the entity data corresponding to the input data 202 and [second location] may be derived from the data stored at the dialog focus component 216.

In some embodiments, the inference engine 222 may employ one or more machine learning models configured to process data from the dialog focus component 216, the entity data from the NER component 218, the input data 202, and/or the other input data 204, along with the dialog models 214 stored at the dialog model storage 230 to predict an action.

In generating a natural language output, the inference engine 222 may send natural language output data to the controller 220. The natural language output data may be text data, structured data, or other natural language representations. The natural language output data may be provided to the NLG component 240, by the controller 220, for processing.

In some embodiments, the inference engine 222 may perform entity resolution after argument filling is complete by the argument filling component 226. An entity resolution component 228, of the inference engine 222, may be configured to perform entity resolution.

In some embodiments, the entity resolution component 228 may perform entity resolution processing to identify the specific entities included in the input data 202. For example, entity resolution processing may result in associating a word in the input data 202 to a particular person, place, thing, idea, and/or goal; example entities include proper names, nicknames, business names, place names, song titles, and skill names.

In some embodiments, the entity resolution component 228 may perform entity resolution processing if the action selector component 224 predicts the API action type. For each entity to fill an API argument, the entity resolution component 228 may search against stored entities and may resolve phrases into canonical values if there is a match. The inference engine 222 may insert the result of the entity resolution processing as a separate payload in the API-invoking request.

In some embodiments, the entity resolution component 228 may not perform entity resolution processing if the action selector component 224 predicts the Response action type. In such embodiments, there may not be a need for resolving a named entity to a specific entity for the Response action type, where the system is outputting a natural language output to inform the user 105 of performance of an action, request the user 105 to provide more information, etc. In invoking an API, there may be a need for a specific entity (thus a need for entity resolution processing) so that the API can execute with respect to the specific entity. In other embodiments, the entity resolution component 228 may perform entity resolution processing for Response action types.

The entity resolution component 228 may apply rules or other instructions to transform labels or tokens into a standard representation. The transformation may depend on the skill. For example, for a travel skill, the entity resolution component 228 may transform text data corresponding to "Boston airport" to the standard BOS three-letter code referring to the airport. The entity resolution component 228 can refer to an entity storage(s) (including data representing entities known to the system 120) to resolve the precise entity referred to in the input data 202. Specific entity combinations may also be tied to a particular source, which may then be used to resolve the entities in the input data 202. In the example "play songs by the [artist]," the entity resolution component 228 may reference a personal music catalog, user profile data, or the like. The entity resolution component 228 may output data including entity IDs corresponding to specific entities mentioned in the user input. The entity resolution component 228 may include multiple entity resolution components and each entity resolution component may be associated with one or more particular skills.

The entity resolution component 228 may use frameworks, linked to skills, to determine what database fields should be searched to determine the meaning of tagged entities, such as searching a user's gazetteer for similarity with the framework entities. For example, a framework for a music skill may indicate to attempt to resolve an identified object based on {Artist Name}, {Album Name}, and {Song name}, and another framework for the same skill might indicate to attempt to resolve an object modifier based on {Artist Name}, and resolve the object based on {Album Name} and {Song Name} linked to the identified {Artist Name}. If the search of the gazetteer does not resolve an entity using gazetteer information, the entity resolution component 228 may search a database of generic words. For example, if the input data 202 includes "play songs by the [artist]," after failing to determine an album name or song name called "songs" by "the [artist]," the entity resolution component 228 may search a vocabulary for the word "songs." In the alternative, generic words may be checked before the gazetteer information, or both may be tried, potentially producing two different entity data results.

The inference engine 222 may process the input data 202 using the selected dialog model(s) 214. In some embodiments, the dialog model(s) 214 may also process dialog context data from the dialog focus component 216. Each dialog model 214 may be a trained model, such as a sequence-to-sequence model, an encoder-decoder model, a neural network, etc., and may be trained using goal-oriented dialog training data. The training data may include dialog data between a user and a system and may include API call information related to goals expressed by the user.

Each of the selected dialog models 214 may generate response data based on the input data 202. The response data may include output text data, which may correspond to a prompt for more information (e.g., additional entity information). The response data may further include API call data and corresponding entities (arguments for the API call).

The action selector component 224 is configured to select at least one of the outputs of the dialog model(s) 214 for further processing. Each output may be associated with a corresponding category of function(s). The action selector component 224 may be a trained model, such as a classifier, and may determine a score for each of the outputs of the dialog models 214 based on each's similarity or relevance to the dialog context data from the dialog focus component 216, based on user preference data (from the profile storage 170), and/or based on the input data 202. The output of the dialog model 214 corresponding to the highest score is selected; if the output is an API call, one or more APIs 210 may be activated and a corresponding action carried out. If, however, the output is a prompt or other output data, the natural language generation (NLG) component 240 may be used to generate the output data 206 (which may be text data or other natural language representation data) and/or other output data 208 based on the output of the dialog model 214. In either case, the selected action may be used to update the dialog context data at the dialog focus component 216.

In some embodiments, the inference engine 222 may invoke the API 210 directly to perform an action. In other embodiments, the inference engine 222 may send a request to the controller 220 to invoke the API 210. In some embodiments, the inference engine 222 may send (via the controller 220 in some embodiments) a command to the skill component 190 to invoke the API 210, where the command may include entity data corresponding to the arguments of the API 210.

In some embodiments, the inference engine 222 may directly send data corresponding to the Response action type to the NLG component 240. In other embodiments, the inference engine 222 may send data corresponding to the Response action type to the controller 220 to send to the NLG component 240.

In some embodiments, the inference engine 222 may send, to the dialog focus component 216, a request for additional context data. This request may be based at least in part on the data needed to execute one or more of the dialog models 214. Alternatively or additionally, this request may be to obtain data to help in selecting one of the dialog models 214 from the dialog model storage 230.

In some cases, if there are any unresolved entities, the inference engine 222 (or the entity resolution component 228) may send to the skill component 190, unresolved entity data. The skill component 190 may process the unresolved entity data and, using the techniques described herein with respect to entity resolution processing, may return resolved entity data to the inference engine 222. The skill component 190 may be, for example, a communication skill, and may include a database of contact information for a user account and may resolve an ambiguous name in the unresolved entity data by, for example, resolving names in the contact information. The inference engine 222 (in some embodiments via the controller 220) may send resolved entity data to the dialog focus component 216 for updating the dialog state data for the current dialog session.

The inference engine 222 (via the controller 220 in some embodiments) may send response action data to the NLG component 240, where the response action data may be used by the NLG component 240 to generate text or other data representing a natural language output. For example, the response action data may include one or more nouns, one or more verbs, one or more objects, one or more subjects, and/or other parts of a sentence that the NLG component 240 can use to generate one or more natural language sentences.

The NLG component 240 may be a trained model, such as a neural network, and may generate output data 206 using the response action data from the inference engine 222. The output data 206 may have a natural feel and, in some embodiments, includes words and/or phrases specifically formatted for the user 105. As opposed to using templates to formulate responses, the NLG component 240 may include ML models trained from the various templates for forming the output data 206. For example, the NLG component 240 may analyze transcripts of local news programs, television shows, sporting events, or any other media program to obtain common components of a relevant language and/or region. As one illustrative example, the NLG component 240 may analyze a transcription of a regional sports program to determine commonly used words and/or phrases for describing scores and/or other sporting news for a particular region. The NLG component 240 may further receive, as input, data from the dialog focus component 216, such as the dialog history and the input data 204. The NLG component 240 may also receive other data that can be used to determine a structure for the output data 206, such as a level of formality in the dialog session (e.g., formal, informal, casual, etc.).

In some embodiments, the NLG component 240 may generate output data 206 based on one or more response templates. For example, the NLG component 240 may select a template in response to the question, "What is the weather currently like?" of the form: "The weather currently is $weather_information$." The NLG component 240 may analyze the logical form of the template to produce one or more natural language responses including markups and annotations to familiarize the response that is generated. In some embodiments, the NLG component 240 may determine which response is the most appropriate response to be selected. The selection may be based on past system responses of the present dialog session, past user inputs of the present dialog session, a level of formality of the present dialog session, and/or other data. Synthesized speech may be generated by processing the output data 206 using the TTS component 180.

In some embodiments, the inference engine 222 (based on processing performed by the action selector component 224) may select an API 210 corresponding to the skill component 190a. Example spoken inputs, that may cause the inference engine 222 to invoke the search skill component 190a, may include words like "search", "find", "show", "tell me", "what", "why", "how", "where", etc.

In other cases, the search skill component 190a may be in-focus while the input data 202 is being processed. The search skill component 190a may be in-focus for a dialog session based on the search skill component 190a being invoked to respond to a first or prior user input of the dialog session, based on the user 105 invoking the search skill component 190a specifically (e.g., by including the skill name in the user input), and/or based on the dialog management component 160 determining the search skill component 190a corresponds to the goal of the dialog session. In some embodiments, another component (e.g., a skill selection component) implemented at the system 120 may determine which skill component is to be invoked/used for a dialog session. The skill selection component may make this determination using the first user input of the dialog session. In some cases, the user 105 may request the system to start/open/launch the search skill (e.g., the user 105 may say "Open Search Skill" or "Start exploring using the Search Skill." In other cases, the skill selection component may use stored data representing sample invocation phrases/inputs (e.g., "search", "find", "show", "tell me", "what", "why", "how", "where", etc.) that trigger the search skill component 190a. The skill selection component may send an indication of the selected/invoked search skill component 190a (e.g., a skill identifier associated with the search skill component 190a, a skill name associated with the search skill component 190a, etc.) to the dialog management component 160, and based on receiving this indication, the dialog management component 160 may determine that the search skill component 190a is in-focus. In other cases, the user 105 may select, using a touch input or other type of input, an icon and/or text, displayed at a screen of the device 110, corresponding to the search skill component 190a to open the search skill (in turn bringing it in-focus). Based on the search skill component 190a being in-focus, the inference engine 222 may invoke the search skill component 190a to respond to the user input corresponding to the input data 202.

The user 105 may end/exit the current dialog session (that the search skill component 190a is generating system responses for) by providing a user input. Example user inputs may include words like "thank you", "I'm done", "exit", "print", "save", "send to my phone", "email me", etc. Alternatively, the user 105 may select an icon and/or text, displayed at the screen of the device 110, that enables the user to end the current dialog session. In response to receiving an input ending the dialog session, the dialog management component 160 may store an indication in the dialog focus component 216 indicating the current dialog session has ended. Any subsequent user inputs received by the system 120 may start a new dialog session, associated with a different dialog session identifier.

Figure 3:
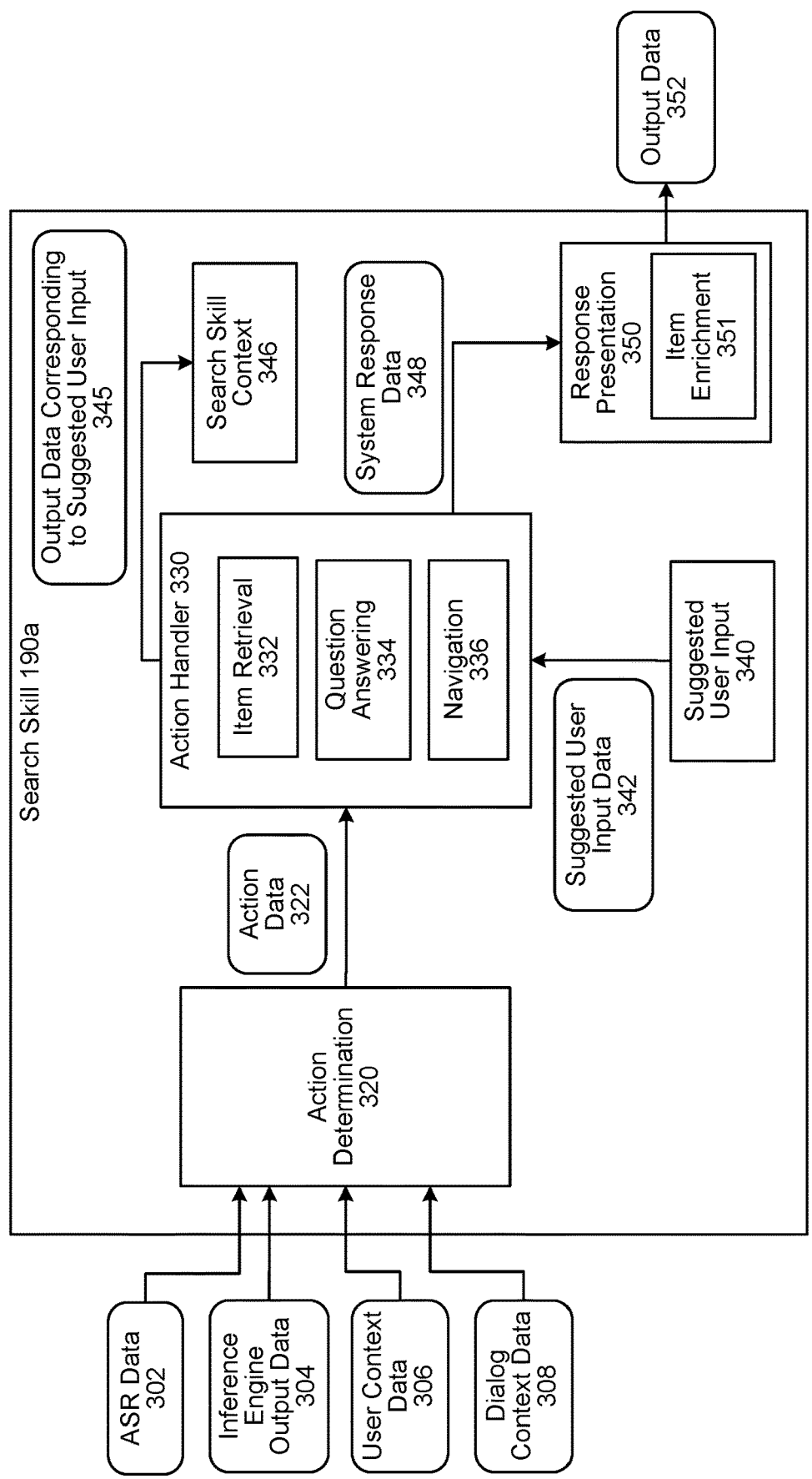
FIG. 3 is a conceptual diagram illustrating how a search skill component may process data, according to embodiments of the present disclosure.

FIG. 3 is a conceptual diagram illustrating how the search skill component 190a may process data, according to embodiments of the present disclosure. The search skill component 190a may be a conversational agent that makes data-driven decisions to respond to user inputs in a multi-turn context. In some embodiments, the search skill component 190a may include an action determination component 320, an action handler component 330, a suggested user input component 340, a search context component 346, and a response presentation component 350.

In some embodiments, the search skill component 190a exposes a single general purpose API named "invoke" that is independent of a domain. The search skill component 190a (via the invoke API call) takes as input the N-best list of ASR hypotheses determined by the ASR component 150, which may be included in ASR data 302. The search skill component 190a may further take as input one or more actions and one or more entities determined by the inference engine 222, which may be included in inference engine output data 304. The inference engine output data 304 may include the action(s) determined by the action selector 224 and the entity(ies) determined by the argument filling component 226 and the entity resolution component 228. The inference engine output data 304 may be an N-best list of action and entity hypotheses, where each hypothesis includes an action and one or more entities.

The search skill component 190a may further take as input user context data 306, which may be received from the orchestrator component 130 or another component within the system 120 or the device 110. The user context data 306 may include information relating to the user 105 (and other users if applicable) that is engaged in the current dialog session, and information relating to the device 110 that is currently engaged in the current dialog session. The user context data 306 may include user profile data associated with the user 105, which may include user preferences, user demographics, user location, user subscriptions, enabled skills for the user profile, etc. The user context data 306 may further include device profile data associated with the device 110, which may include device type, device name, device identifier, device location, device input/output capabilities, display constraints (e.g., based on what is already being presented via the display for the device 110, screen size of the device 110, whether multiple tabs/pages are enabled for presentation at the device 110, etc.), etc.

The search skill component 190a may further take as input dialog context data 308, which may be received from the dialog management component 160 or another component within the system 120 or the device 110. The dialog context data 308 may include information relating to the current dialog session. Example data that may be included in the dialog context data 308 is illustrated in FIG. 6 and described in detail below. The dialog context data may include one or more of the following data: previous user input data 602, previous item results data 604, previous suggested user inputs data 606, previous user selected item results data 608, previous entities data 610 and previous action data 610.

The search skill component 190a may be configured to output a single (1-best) system response (e.g., included in the system response data 348) based on processing the foregoing received inputs. The system response, for example, may be one or more item results and one or more suggested user inputs. In some embodiments, the system response may be templatized so that different output templates for different domains can use the system response to generate output data to be presented at the device 110. The templatized system response may also be compatible with different display placement contexts.

Placement contexts may be information about where, on the display screen of the device 110, the output from the search skill component 190a can be rendered, and what can be included in the output. For example, for a shopping domain search results (e.g., product pages, product reviews, etc.), the placement context may indicate that the search results can be presented as multiple vertical panels on the screen, multiple horizontal panels on the screen (providing a list-like presentation), etc. The shopping domain placement context may further indicate that the output may include a store/seller name, a search result number, an indication of the user input (e.g., "gifts for mom"), any search criteria/refinements applied (e.g., "gifts under $25"), customer ratings, etc. As another example, the placement context for a recipe domain may indicate that the output may be presented as a single card on the screen, such that a first recipe is presented in a first card, a second recipe is presented in a second card, etc. The user 105 may toggle between cards by swiping on the cards, saying "next" or by changing tabs on the screen. The placement context for the recipe domain may indicate that the output may include a recipe name, a name of the person who wrote the recipe, a name of a publisher of the recipe (e.g., a website, a magazine, etc.), a customer rating, an indication of the main ingredient, etc. The placement context may be an audio-visual output template.

The action determination component 320 may be configured to process the ASR data 302, the inference engine output data 304, the user context data 306, and the dialog context data 308 to determine action data 322 including an N-best list of actions and entities corresponding to the current user input. In some embodiments, the action determination component 320 may not process the inference engine output data 304. In other embodiments, the search skill component 190a may use the inference engine output data 304 as the action data 322 sent to the action handler component 330. The action determination component 320 may use rule-based processing and/or one or more ML models to determine an action and one or more entities corresponding to the user input. In some embodiments, the action determination component 320 may be configured to determine the action corresponding to the user input from a set of actions that correspond to searching for information (e.g., searching for products, searching for songs, searching for news, etc.). In some embodiments, the action determination component 320 may employ one or more domain-specific rules and/or models (e.g., a rule(s) and/or model(s) corresponding to a music domain, a rule(s) and/or model(s)

corresponding to a news domain, etc.). The action determination component 320 may determine actions corresponding to multiple different domains. For example, the action determination component 320 may determine a first action corresponding to a shopping domain, a second action corresponding to a news domain, etc. Each of the determined actions may be associated with a confidence score, and the actions associated with confidence scores that satisfy a condition (e.g., meet a threshold confidence value, the highest 5 scoring actions, etc.) may be included in the action data 322. As such, the action data 322 may include actions corresponding to different domains. In some embodiments, the action determination component 320 may also determine one or more entities corresponding to the user input using one or more domain-specific rules and/or models. In some embodiments, the action data 322 may also include a domain name corresponding to the action.

As used herein an entity represents a person, a place, a thing, a topic, a time, a date, or other real word object. Entity data corresponding to an entity may include an entity type, such as person, place, thing, topic, time, date, etc., and also includes the entity value, such as the person name, the place name, the name of the thing, the topic, the time, the date, etc. For example, entity data may be {entity type: Date; entity value "2020 Jan. 1"}. The search skill component 190a may employ its own entity schema or may use an external entity schema. In some embodiments, the entity data may also include a global entity identifier (ID) which may refer to a particular object data, corresponding to the entity, in a particular data source (the authority for that specific entity).

The action determination component 320 may be configured to determine a user action (i.e. an action requested by the user 105 via the user input), and the action handler component 330 may be configured to determine a system action (i.e. a system response to the user input). The user action, included in the action data 322, may be represented as an intent, such as, "RequestSearch", "RequestMore" "AskQuestion", etc., and may be associated with one or more particular entities (arguments) needed to perform the action. The system action may be represented as "InformResults", "AnswerQuestion", etc.

The following is a description of some example user actions that may be determined by the action determination component 320. One example user action may be "RequestSearch" requiring item value, and optionally sort order. A user may initiate a search with a criteria and an optional sort order. For example, the user 105 may say "What can I cook with apples", and the action determination component 320 may determine the user action to be RequestSearch (item value=Recipe (ingredient="apples")). As another example, the user 105 may say "Show me chicken recipes that are not spicy", and the action determination component 320 may determine the user action to be RequestSearch (item value=Recipe (ingredient="chicken", feature="spicy")). As another example, the user 105 may say "show me chicken recipes sorted by price", and the action determination component 320 may determine the user action to be RequestSearch (item value=Recipe (ingredient="chicken"), sort value=Price)).

Another example user action may be "ReferenceItem" requiring item position information or item value information. A user may refer to an item via anaphora, and the action determination component 320 may select the "ReferenceItem" action to resolve anaphoric references for the intended user action. For example, the user 105 may say "second one", and the action determination component 320 may determine the user action to be ReferenceItem (item position=2). As another example, the user 105 may say "show me the free one", and the action determination component 320 may determine the user action to be ReferenceItem (item value=Product (price="free")). As yet another example, the user 105 may say "the cheese sandwich", and the action determination component 320 may determine the user action to be ReferenceItem (item value=Recipe (title="cheese sandwich")).

Another example user action may be "RequestMore" optionally requiring item value. A user may request more items with optionally adding criteria. This user action also captures user inputs corresponding to pagination, such as, show me next page, etc. For example, the user 105 may say "show me more" when the device 110 is a page of item results, and the action determination component 320 may determine the user action to be RequestMore ( ). As another example, the user 105 may say "Show me more breakfast recipes, and the action determination component 320 may determine the user action to be RequestMore (item value=Recipe (mealType=Breakfast)).

Another example user action may be "RequestAlternatives" optionally requiring item value. A user may request alternative item results to what has already been presented, and may optionally provide some criteria. For example, the user 105 may say "What else do you have?", and the action determination component 320 may determine the user action to be RequestAlternatives( ). As another example, the user 105 may say "Show me something cheaper", and the action determination component 320 may determine the user action to be RequestAlternatives (item value=Product (price="cheaper")).

Another example user action may be "RequestSimilar" requiring item value. A user may request more item results to what has already been presented, and may optionally provide some criteria for the similar item results. For example, the user 105 may say "Show me more like this recipe", and the action determination component 320 may determine the user action to be RequestSimilar (item value=recipe name). The recipe name may be determined by using the "ReferenceItem" action.

Another example user action may be "RequestDetail" requiring item value. A user may request more information about an item result being presented at the device 110. For example, the user 105 may say "Tell me more about the first recipe", and the action determination component 320 may determine the user action to be RequestDetail (item value=recipe name). The recipe name may be determined by using the "ReferenceItem" action.

Another example user action may be "AskQuestion" optionally requiring item value. A user may ask a question related to an item result presented at the device 110 or a domain-related question. For example, the user 105 may say "What is a Sous Vide?", and the action determination component 320 may determine the user action to be AskQuestion ( ). As another example, the user 105 may say "What is a good substitute for nutmeg?", and the action determination component 320 may determine the user action to be AskQuestion ( ). As another example, the user 105 may say "How many calories is it?" and the action determination component 320 may determine the user action to be AskQuestion (item value=recipe name). The recipe name may be determined by using the "ReferenceItem" action.

Another example user action may be "RequestPrevious". A user may request to navigate to a previous page, view or item result. For example, the user 105 may say "Go back" and the action determination component 320 may determine the user action to be RequestPrevious ( ).

The action determination component 320 may be configured to determine entity data using anaphora resolution techniques based on which item results are presented at the device 110. Data corresponding to the item results presented (e.g., the previous item results data 604) at the device 110 may be included in the dialog context data 308. For example, if the user input is "how much is it" then using reference by pronoun, the currently presented item result is used to determine the entity data. As another example, if the user input is "how much is the second one", then using ordinal position, the second item result presented at the device 110 is used to determine the entity data. As another example, if the user input is "how much is the last one" then using relative position, the last item result presented at the device 110 is used to determine the entity data. As another example, if the user input is "how much is the red one" then using reference by attribute, the item result corresponding to an attribute matching the referenced entity value is used to determine the entity data.

The action handler component 330 may be configured to determine the system response to the user input based on processing the action data 322 (the N-best list of actions and entities). In some embodiments, the action handler component 330 may also process the ASR data 302, the user context data 306 and the dialog context data 308.

In some embodiments, the action handler component 330 may use rules-based processing and/or ML models to determine which component(s) to invoke based on the action data 322. The action handler component 330 may process with respect to each of the actions included in the N-best list in the action data 322. In some embodiments, the rules and/or ML models may be domain-specific.

The action handler component 330 may be configured to determine which components to invoke to retrieve information requested in the user input. The action handler component 330 may include various components and/or may interface with various external components or systems. In some embodiments, the action handler component 330 may invoke one or more components via an API request. In some embodiments, the action handler component 330 may employ APIs that invoke domain-specific components or systems to retrieve domain-specific content. For example, a search API call (with arguments: type of search results=products, entity data=item name) may be sent to a shopping domain data source (e.g., a retail catalog) to retrieve products corresponding to the item name, and a search API call (with arguments: type of search results=articles, entity data=item name) may be sent to a news domain data source (e.g., published articles) to retrieve articles corresponding to the item name.

In some embodiments, the action handler component 330 may be configured to process user inputs corresponding to various domains. For example, the user input "show me gifts for mom" may correspond to a shopping domain, the user input "what is going on in Boston today" may correspond to a news domain, and the user input "play some jazz" may correspond to a music domain. The action handler component 330 may include or interface with components or systems that are associated with the various domains. The action handler component 330 may determine which domain a user input corresponds to, and may then determine which component(s) to invoke to respond to the user input. In some embodiments, the action handler component 330 may implement a rule engine to determine which domain a user input corresponds to or which component(s) to invoke to respond to a user input. Additionally or alternatively, the action handler component 330 may implement a ML model(s) to determine which domain a user input corresponds to or which component(s) to invoke to respond to a user input. In some embodiments, the action handler component 330 may determine which domain a user input corresponds to, and may then use one or more domain-specific rules and/or ML models to determine which component(s) to invoke to respond to the user input.

One of the components included in the action handler component 330 may be an item retrieval component 332. The item retrieval component 332 may be configured to receive a user input (e.g., a question, a query, a statement, etc.), and output multiple search results (e.g., websites, articles, products, songs, etc.) corresponding to the user input. The item retrieval component 332 may determine search results to fulfill a user's search goal. The item retrieval component 332 may aggregate search results from multiple data sources, for example, by searching publicly available information on the Internet (e.g., websites), using one or more knowledge bases, using retail catalogs, using product catalogs, or using other data sources. The item retrieval component 332 may include or may interface with various other components that may provide access to and search various data sources. For example, the item retrieval component 332 may interface with a first component that provides access to a first knowledge base, a second component that searches the Internet, a third component that provides access to a retail catalog, etc. In some embodiments, the item retrieval component 332 may invoke domain-specific data sources based on which domain corresponds to the user input. The item retrieval component 332 may output search results in the form of a list of products, a list of articles, a list of webpages, a list of songs, a list of other items, or a combination of any of the foregoing items.

Figure 4:
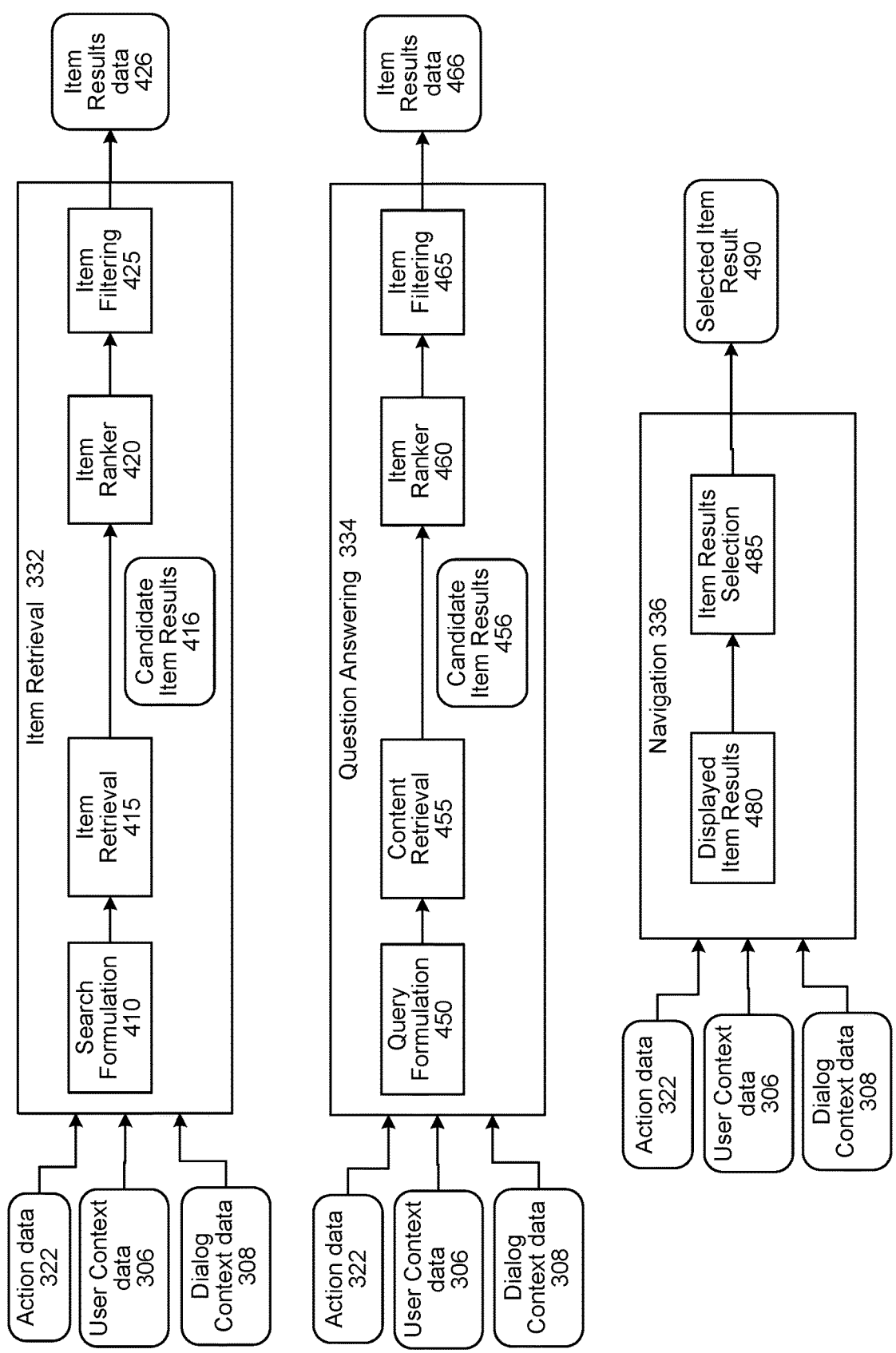
FIG. 4 is a conceptual diagram illustrating an item retrieval component, a question answering component, and a navigation component which may process in relation to the search skill component, according to the embodiments of the present disclosure.

FIG. 4 shows example components that may be included in the item retrieval component 332. In some embodiments, the item retrieval component 332 may take as input the action data 322, the user context data 306 and the dialog context data 308. A search formulation component 410 may generate a search request based on the foregoing received inputs. The search request may identify one or more types of items to be retrieved. Example items may be websites, news articles, products, recipes, songs, movies, TV shows, podcasts, etc. The search request may further identity an entity for which items are to be retrieved. If an action corresponds to more than one entity in the action data 322, then the search formulation component 410 may determine a separate search request for each entity, in some embodiments. The search request may further identify any applicable criteria for retrieving the items, such as criteria that may be included in the user input.

An item retrieval component 415 may execute the search request(s) generated by the search formulation component 410. The item retrieval component 415 may determine one or more data sources to send the search request(s) to. The data sources may send multiple candidate item results 416 to the item retrieval component 415.

An item ranker component 420 may rank the candidate item results 416 based on the action data 322 (e.g., using confidence scores corresponding to the action and/or entity data, using the entities represented in the action data 322, etc.), the user context data 306 and the dialog context data 308. For example, the item ranker component 420 may rank the candidate item results 415 based on relevancy of the respective item result to the information represented in the action data 322, the user context data 306, and the dialog context data 308, and/or based on a number of times entities represented in the action data 322, the user context data 306, and the dialog context data 308 are included in the respective item result. The item ranker component 420 may use rule-based processing and/or one or more ML models to rank the candidate item results 416. The ranked candidate item results may be processed by an item filtering component 425.

The item filtering component 425 may employ one or more filtering techniques based on the information represented in the action data 322, the user context data 306 and the dialog context data 308. One or more filtering techniques used by the components described herein may involve use of machine learning models and/or rule-based engines. One or more filtering techniques may involve removal/filtering of redundant item results or information. One or more filtering techniques may involve choosing the top N item results based on the ranking score by the item ranker component 420. One or more filtering techniques may involve removal/filtering of item results that do not include information, with some frequency, relating to the search query.

In some embodiments, the candidate item results 416 may be filtered first by the item filtering component 425, and then ranked by the item ranker component 420.

After filtering, the item retrieval component 332 may output item results data 426. The item results data 426 may be links pointing to the item result (e.g., a product page, a news article, a website, an image, etc.). The item results data 426 may be text data, image data, video data, or other type of data corresponding to the item result.

Referring again to FIG. 3, one of the components included in the action handler component 330 may be a question answering (Q&A) component 334. The Q&A component 334 may be configured to receive a user input (e.g., a question, a query, a statement, etc.), and generate a single answer (e.g., a single word answer, a sentence, a summary, etc.) to the user input. The Q&A component 334 may generate the answer by searching publicly available information on the Internet, using one or more knowledge bases, or using other data sources. The Q&A component 334 may include or may interface with various other components that may provide access to and search various data sources. For example, the Q&A component 334 may interface with a first component that provides access to a first knowledge base, a second component that searches the Internet, a third component that provides access to a retail catalog, etc. The Q&A component 334 may present an answer in various forms, for example, as an excerpt from a data source, as a summary generated from information retrieved from a data source, etc. The Q&A component 334 may implement one or more summarization techniques to summarize information retrieved from one or more data sources. In some embodiments, the Q&A component 334 may invoke domain-specific data sources based on which domain corresponds to the user input.

FIG. 4 shows example components that may be included in the Q&A component 334. In some embodiments, the Q&A component 334 may take as input the action data 322, the user context data 306 and the dialog context data 308. A query formulation component 450 may generate a query based on the foregoing received inputs. The query may be in a form that is capable of being processed by certain data sources, such as knowledge bases. The query formulation component 450 may identify a type of query (e.g., how, what, who, which, when, etc.), may identify an entity, and may identify any other criteria for the query. The query formulation component 450 may determine a separate query for each entity represented in the action data 322.

The Q&A component 334 may further include a content retrieval component 455. The content retrieval component 455 may execute the queries generated by the query formulation component 450. The content retrieval component 455 may send the queries to one or more data sources. The data sources may send multiple candidate item results 456 to the content retrieval component 455.

The Q&A component 334 may also include an item ranker component 460. The item ranker component 460 may rank the candidate item results 456 based on the action data 322 (e.g., using confidence scores corresponding to the action and/or entity data, using the entities represented in the action data 322, etc.), the user context data 306 and the dialog context data 308. For example, the item ranker component 460 may rank the candidate item results 415 based on relevancy of the respective item result to the information represented in the action data 322, the user context data 306, and the dialog context data 308, and/or based on a number of times entities represented in the action data 322, the user context data 306, and the dialog context data 308 are included in the respective item result. The item ranker component 460 may use rule-based processing and/or one or more ML models to rank the candidate item results 456. The ranked candidate item results may be processed by an item filtering component 465.

The item filtering component 465 may employ one or more filtering techniques based on the information represented in the action data 322, the user context data 306 and the dialog context data 308. After filtering, the Q&A component 334 may output item results data 466. The item results data 466 may be links pointing to the item result (e.g., a product page, a news article, a website, an image, etc.). The item results data 466 may be text data, image data, video data, or other type of data corresponding to the item result.

The item retrieval component 332 and the Q&A component 334 may interface with multiple different data sources or components that support semantic searching (e.g., through the use of embeddings), lexical matching searching, or both. Such data sources or components may crawl the web, retrieve domain-specific content, process the retrieved documents to extract entities and attributes, and generate documents which may be entity-centric or tagged with relevant entities. Such data sources or components may further implement one or more indexing techniques that enable batch processing of the extracted documents and real-time indexing of the extracted documents in a format optimized for fast retrieval (e.g., flattening the nested structured, coalescing arrays, etc.). As such, the item results may correspond to different data sources.

Referring again to FIG. 3, the action handler component 330 may also include a navigation component 336. The navigation component 336 may be configured to handle user inputs relating to navigating the item results presented to the user 105. For example, the action handler component 330 may invoke the navigation component 336 to handle user inputs such as "go back", "show me more", etc. The action handler component 330 may also invoke the navigation component 336 to perform anaphora resolution for user inputs such as "show me more like this," "go to the second one," "show me the red one", etc. The navigation component 336 may output selected item result data 490 (illustrated in FIG. 4) corresponding to the item result selected by the user 105/indicated in the user input.

FIG. 4 shows example components that may be included in the navigation component 336. In some embodiments, the navigation component 336 may take as inputs the action data 322, the user context data 306 and the dialog context data 308. The navigation component 336 may include a displayed item results component 480 configured to determine which item results are presently displayed at the device 110. The displayed item results component 480 may make this determination based on the information included in the dialog context data 308. For example, the display item results component 480 may determine which item results were presented to the user 105 during the immediate previous turn of the dialog session.

The display item results component 480 may send, to an item results selection component 485, data representing the item results displayed at the device 110 when the current user input is received. Such data may also include an order in which the item results are displayed.

The item results selection component 485 may determine which of the displayed item results the user input corresponds to based on performing anaphora resolution techniques. For example, the item results selection component 485 may determine the user input includes an ordinal position reference ("show me the second website"), and may determine an item result, from the displayed item results, corresponding to the ordinal position. As another example, the item results selection component 485 may determine the user input includes an attribute reference ("tell me more about the red one"), and may determine an item result, from the displayed item results, corresponding to the indicated attribute. The item result determined by the item results selection component 485 may be outputted as the selected item result data 490.

In some embodiments, the action handler component 330 may employ early binding techniques in determining the system response to the user input. In the early binding techniques, the action handler component 330 may select one system action and component or system to invoke to generate the system response corresponding to the user input. For example, the action handler component 330 may select the system response to be "AnswerQuestion" and may invoke the Q&A component 334 to retrieve item results, and may use the received item results to determine the system response data 348 (without invoking the item retrieval component 332 or the navigation component 336).

In some embodiments the action handler component 330 may employ late binding techniques in determining the system response to the user input. In the late binding techniques, the action handler component 330 may select multiple components or systems to invoke to retrieve candidate item results or responses, and then determine the system response based on the retrieved item results or responses. For example, the action handler component 330 may determine the system action to be "AnswerQuestion" and may invoke the Q&A component 334, and may also determine the system action to be "RequestSearch" and may invoke the item retrieval component 332. Then the action handler component 330 may determine the system response data 348 to include item results from the Q&A component 334 and/or the item retrieval component 332.

Once the action handler component 330 receives results from the invoked component(s), the action handler component 330 may invoke the suggested user input component 340 (illustrated in FIG. 3). The suggested user input component 340 may be configured to generate suggested user inputs (e.g., utterances) for a user to try as a follow up input. The suggested user inputs generated by the suggested user input component 340 may additionally or alternatively include suggested entities for a user to try to pivot or refine the initial user input. The suggested user input component 340 may be configured to determine related content for the user input to encourage further exploration by a user.

The suggested user input component 340 may be configured to determine one or more suggested user inputs that guide the user 105 in exploring, searching, or learning about an entity/area of interest (e.g., a place, a person, a thing, a topic, an event, etc.). The suggested user inputs may be options or alternatives that are relevant to one or more user inputs of the current dialog session. With each dialog turn, the suggested user input component 340 updates or determines new suggested user inputs to enable further engagement with the user 105. The suggested user inputs may also enable the user 105 to explore related entities. For example, if the user 105 requests information about a particular event (e.g., a space shuttle launch), the suggested user inputs may correspond to a related entity (e.g., the space shuttle manufacturer, the space shuttle owner, another space shuttle launch, etc.). In the example case where the search skill component 190a has presented multiple item results and the user 105 has viewed all the item results, the suggested user input(s) may prompt the user to learn about a related entity, thus, attempting to increase engagement with user 105 (e.g., receive further user inputs for the current dialog session).

Figure 5:
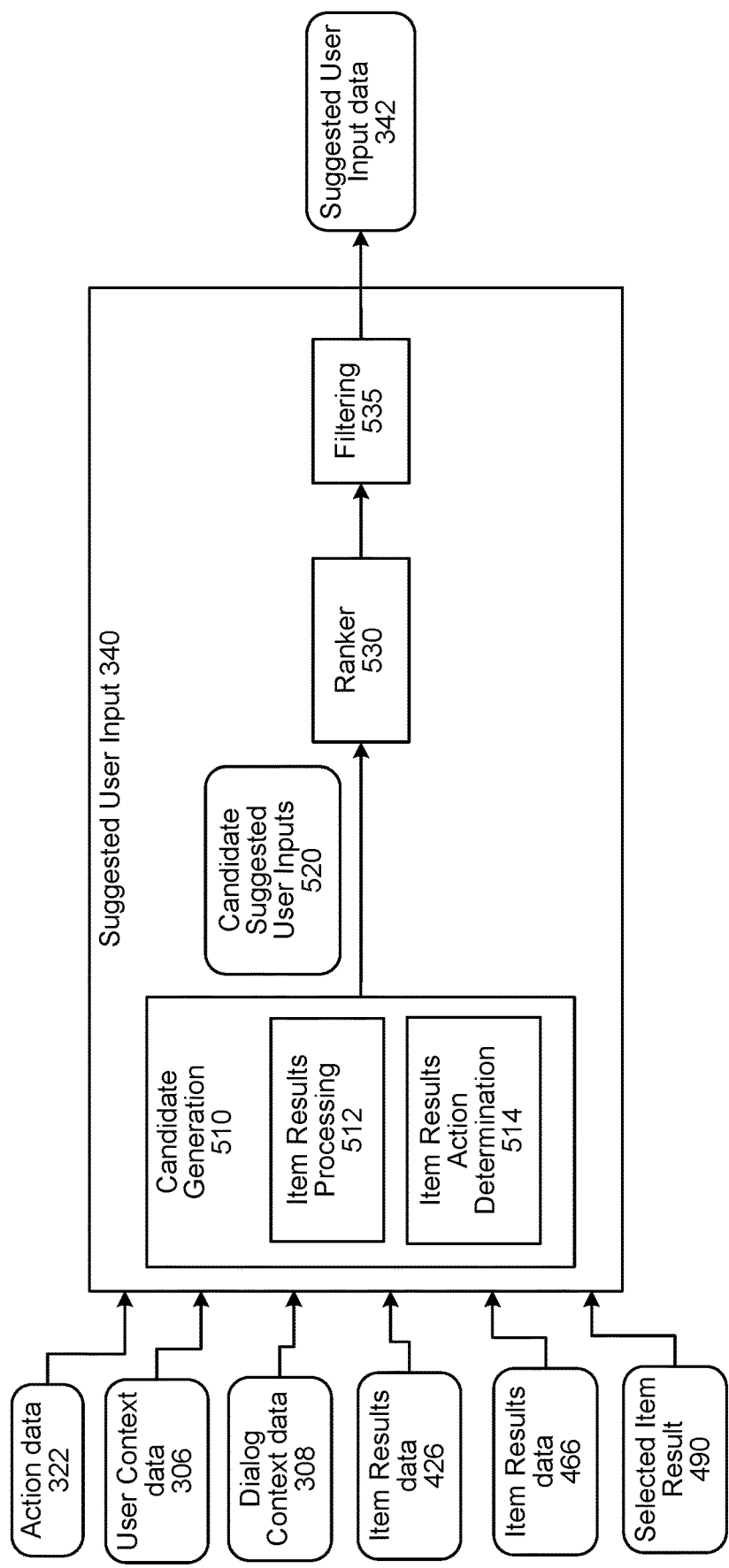
FIG. 5 is a conceptual diagram illustrating a suggested user input component which may process in relation to the search skill component, according to the embodiments of the present disclosure.

FIG. 5 shows example components of the suggested user input component 340. In some embodiments, the suggested user input component 340 may take as inputs the action data 322, the user context data 306, the dialog context data 308, the item results data 426, the item results data 466, and the selected item result data 490. A candidate generation component 510 may process the foregoing received inputs to determine multiple candidate suggested user inputs 520.

The candidate generation component 510 may use one or more machine learning models to determine candidate suggested user inputs 520. The machine learning models may be configured to determine suggested user inputs, based on the inputs shown in FIG. 5, that may facilitate further exploration and further engagement by the user 105. In some embodiments, the candidate generation component 510 may use one or more dialog models, and may select a dialog model(s) corresponding to the dialog context data or other of the received inputs (shown in FIG. 5) to determine the candidate suggested user inputs 520. The dialog models may correspond to a dialog flow, may indicate dialog turns including a user input and a system response corresponding to the user input, and may indicate an order in which dialog turns may occur. The dialog models may be associated with a particular entity (e.g., person, place, thing, topic, event, etc.). The dialog models may be configured to lengthen a dialog session between a user and the system. In some embodiments, the dialog models may be based on historic dialog sessions between multiple users and the system 120.

In some embodiments, the candidate generation component 510 may select a dialog model(s) that best matches the received inputs, and may determine a dialog turn within the dialog model that corresponds to the current user input, the current item result(s), or the current system response. Using a dialog turn following the determined dialog turn in the dialog model, the candidate generation component 510 may determine a candidate suggested user input (which may be the user input of the subsequent dialog turn).

The candidate generation component 510 may select multiple dialog models as corresponding to the received inputs. The candidate generation component 510 may rank the selected dialog models based on which one results in a longer dialog session (e.g., results in receiving more user inputs from the user 105, results in presenting more item results, etc.), which may be based on a number of dialog turns included in the dialog model. For example, a first dialog model may include a second dialog turn corresponding to the current user input, and the second dialog turn may be followed by another 10 dialog turns in the first dialog model. Another second dialog model may include a fifth dialog turn corresponding to the current user input, and the fifth dialog turn may be followed by another 2 dialog turns in the second dialog model. Based on the first dialog model providing more potential dialog turns than the second dialog model, the first dialog model may be ranked higher than the second dialog model. The candidate generation component 510 may determine a first candidate suggested user input as the user input included in the third dialog turn of the first dialog model. The candidate generation component 510 may determine a second candidate suggested user input as the user input included in the sixth dialog turn of the second dialog model. In some cases, the first candidate suggested user input may be ranked higher than the second candidate suggested user input (by the candidate generation component 510 or the ranker component 530 described below).

An item results processing component 512 may process the item results data 426, the item results data 466 and/or the selected item result data 490. The item results processing component 512 may be configured to determine information represented in the foregoing inputs. For example, the item results processing component 512 may determine one or more entities represented in the item results data 426, the item results data 466 and/or the selected item result data 490. As another example, the item results processing component 512 may determine one or more attributes corresponding to the item results data 426, the item results data 466 and/or the selected item result data 490. Example attributes for item results relating to products may be a price range, a product characteristic, a product rating, etc. Example attributes for item results relating to recipes may be cuisine type, ingredient type, cooking skill level, review/rating, cooking time, etc. Example attributes for item results relating to news articles may be topics, geographic area, recency of news, etc. In some embodiments, the item results processing component 512 may employ one or more summarization techniques to generate a summary of information represented in the item results data 426, the item results data 466 and/or the selected item result data 490. In some embodiments, the item results processing component 512 may determine answers represented in the item results data 426, the item results data 466 and/or the selected item result data 490. The item results processing component 512 may employ one or more entity recognition techniques, one or more textual data processing techniques, one or more semantic analysis techniques, one or more summarization techniques, one or more natural language processing techniques, and/or other techniques for processing the item results data 426, the item results data 466 and/or the selected item result data 490. The item results processing component 512 may output entity data corresponding to one or more entities, attributes, summaries corresponding to the information, answers, or other information represented in the item results data 426, the item results data 466 and/or the selected item result data 490.

An item results action determination component 514 may be configured to determine an action that can be performed with respect to the item results data 426, the item results data 466 and/or the selected item result data 490. The item results action determination component 514 may use the output of the item results processing component 512 to determine the action. The action may be one that the user 105 can perform with respect to the entities, the attributes, the summaries, the answers, or other information derived from the item results data 426, the item results data 466 and/or the selected item result data 490 by the item results processing component 512. The action may be represented as an intent, which may be converted to a natural language output at a later stage (e.g., by the action handler component 330, the response presentation component 350, the NLG component 240, or another component). For example, the actions that the item results action determination component 514 may select from include "Show", "AskQuestion", "ShowDetails", etc. In some embodiments, the actions may be represented as natural language output templates, and may include "show me more about <entity>", "what is <entity>", "show me more information about <item result>", "show me <item results> for <attribute>", etc. The item results action determination component 514 may employ rule-based processing and/or one or more ML models to determine actions that can be performed with respect to the information represented in the item results data 426, the item results data 466 and/or the selected item result data 490.

The candidate generation component 510 may determine a list of suggested user inputs based on the entities, attributes, summaries, answers and other information determined by the item results processing component 512 and the actions determined by the item results action determination component 514. In some embodiments, the candidate generation component 510 may use various combinations of the actions and the information to determine the candidate suggested user inputs 520. For example, a first suggested user input may be based on a first action (e.g., "Show") and a first entity, a second suggested user input may be based on the first action and a second entity, a third suggested user input may be based on a second action (e.g., "AskQuestion") and the first entity, and so on. The candidate generation component 510 may employ rules-based processing and/or one or more ML models. The candidate generation component 510 may employ certain techniques that match an action with the appropriate type of information. For example, if the information is a summary, then the action may be "ShowDetails." As another example, if the information is an answer, then the action may be "AskQuestion."

In some embodiments, the candidate generation component 510 may output the user input that the user 105 is to say. For example, the candidate suggested user inputs 520 may be in the form of "show me more information" or "what is the [attribute] of the [item result]". In other embodiments, the candidate generation component 510 may output the user input in the form of a suggestion. For example, the candidate suggested user inputs 520 may be in the form of "you can say 'show me more information'" or "try asking 'what is the [attribute] of the [item result].'"

A ranker component 530 may rank the candidate suggested user inputs 520 based on, for example, information represented in the action data 322, the user context data 306, and the dialog context data 308. The ranker component 530 may, for example, rank the candidate suggested user inputs based on a relevancy of the respective suggested user input to the action data 322. The ranker component 530 may use rule-based processing and/or one or more ML models for ranking the candidate suggested user inputs 520.

A filtering component 535 may filter the ranked suggested user inputs based on, for example, information represented in the action data 322, the user context data 306, and the dialog context data 308. The filtering component 535 may use one or more filtering techniques and policies. For example, suggested user inputs which have already been presented to the user 105 during the current dialog session (as indicated in the dialog context data 308) may be filtered out/removed. As another example, suggested user inputs which may be similar to (lexically similar or semantically similar) to a previous user input received during the current dialog session (as indicated in the dialog context data 308) may be filtered out/removed. As such, the filtering component 535 may remove suggested user inputs which may have been already presented or may have been already received as user inputs. The filtered suggested user inputs may be outputted as the suggested user input data 342. In some embodiments, the suggested user input data 342 may correspond to one or more suggested user inputs, and may be represented as structured natural language output data. In some embodiments, the filtering component 535 may first filter the candidate suggested user inputs 520, and then the ranker component 530 may perform ranking.

Referring again to FIG. 3, the suggested user input component 340 may send the suggested user input data 342 to the action handler component 330. The action handler component 330 may determine to include one or more of the suggested user inputs from the suggested user input data 342 in the system response data 348.

The action handler component 330 may also determine output data corresponding to the suggested user input(s) 345 determined to be included in the system response data 348. In some embodiments, the suggested user input component 340 may provide the output data corresponding to the suggested user input(s) 345 based on, for example, processing performed by the candidate generation component 510. In other embodiments, the action handler component 330 may invoke one or more components (in a similar manner as described above when processing a user input from the user 105) to determine the output data corresponding to the suggested user input(s) 345. The output data corresponding to the suggested user input(s) 345 may be stored at a search skill context component 346. The output data 345 may be associated with its corresponding suggested user input while stored by the search skill context component 346. In some embodiments, when the system 120/the search skill component 190a receives a subsequent user input, from the user 105, corresponding to (e.g., lexically matching or semantically matching) a suggested user input presented to the user 105, the search skill component 190a may retrieve the corresponding output data 345 from the search skill context component 346. The retrieved output data 345 may be used to determine additional suggested user inputs and determine the system response data 348 responsive to the subsequent user input.

The response presentation component 350 may be configured to determine how a response to the user input is to be presented and what the response is to include. An item enrichment component 351 of the response presentation component 350 may supplement the item results generated by the item retrieval component 332 or the Q&A component 334 with additional information based on which domain the user input corresponds to. For example, the item enrichment component 351 may supplement the system response data 348 with price and availability information for products represented in the item results. As another example, the item enrichment component 351 may supplement the system response data 348 with images of entities mentioned in news articles represented in the item results. As another example, the item enrichment component 351 may supplement the system response data 348 with ratings, reviews, best-seller indications, new product indications, etc. relating to the item results. The item enrichment component 351 may search for the additional information using various data sources, such as a publicly available information on the Internet, or indexed data sources that may be maintained by the system 120 or another system associated with the search skill component 190a.

In some embodiments, the response presentation component 350 may take as input the user context data 306 and the dialog context data 308, along with the system response data 348. The response presentation component 350 may generate output data 352 which may be used by the orchestrator component 130 (or another component in the system 120 or the device 110) to generate directives/commands for the device 110 to output the output data 352. The output data 352 may correspond to a multi-modal output, for example, an audio-visual output that causes the device 110 to display item results and output synthesized speech.

The response presentation component 350 may use one or more domain-specific templates to determine how the output data 352 to be presented at the device 110. A domain-specific template may indicate whether item results are to be displayed in multiple rows, multiple columns, in multiple cards, each card being displayed on a separate tab/page, etc. A domain-specific template may also indicate how the suggested user input(s) is to be presented at the device 110, for example, at the bottom of the screen, at the top of the screen, at the side of the screen, etc.

The output data 352 may include one or more item results, additional information corresponding to one or more of the item results, and one or more suggested user inputs. In some embodiments, the dialog management component 160, using the dialog focus component 216, may update the dialog context data for the current dialog session using the output data 352. In some embodiments, the search skill component 190a may provide data indicating which component or system (e.g., the item retrieval component 332, the Q&A component 334, the navigation component 336, etc.) the action handler component 330 determined to use item results from in response to the user input.

In some embodiments, the output data 352 may be provided to the controller component 220 of the dialog management component 160, and the controller component 220 may send the output data 352 to the NLG component 240 for processing and determining the output data 206 corresponding to the output data 352.

The search skill component 190a may support saving or storing of information and item results corresponding to the current dialog session. During the current dialog session, the user 105 may provide a user input indicating the user wants to save one or more item results and/or information relating to the dialog session. For example, the user 105 may say "save the first [item result]", "save search session" or other similar inputs. Alternatively, the user 105 may select an icon and/or text, displayed at the screen of the device 110, enabling the user 105 to save one or more item results and/or information relating to the dialog session. Such inputs may be routed to the search skill component 190a for processing, the action determination component 320 may determine the action data 322, as described above, and the action handler component 330 may invoke the navigation component 336 or another component to respond to the user input. The search skill component 190a may determine which item results the user 105 wants to save, and may store search session data in a search session storage. The search session storage may be included in or associated with the search skill component 190a. In other embodiments, the search session storage may be included in or associated with the system 120. In other embodiments, the search skill component 190a may store the search session data in the profile storage 170.

In either case, the search session data may be associated with a profile identifier for the user 105, and may include certain context information, such as, a time when the dialog session corresponding to the search session data began and ended, user inputs received during the dialog session, system responses (including suggested user inputs) generated during the dialog session, item results displayed during the dialog session, item result(s) selected by the user 105, item result(s) saved by the user 105, etc. The search session data may include information that may enable the user 105 to resume the search experience at a later time.

Figure 11:
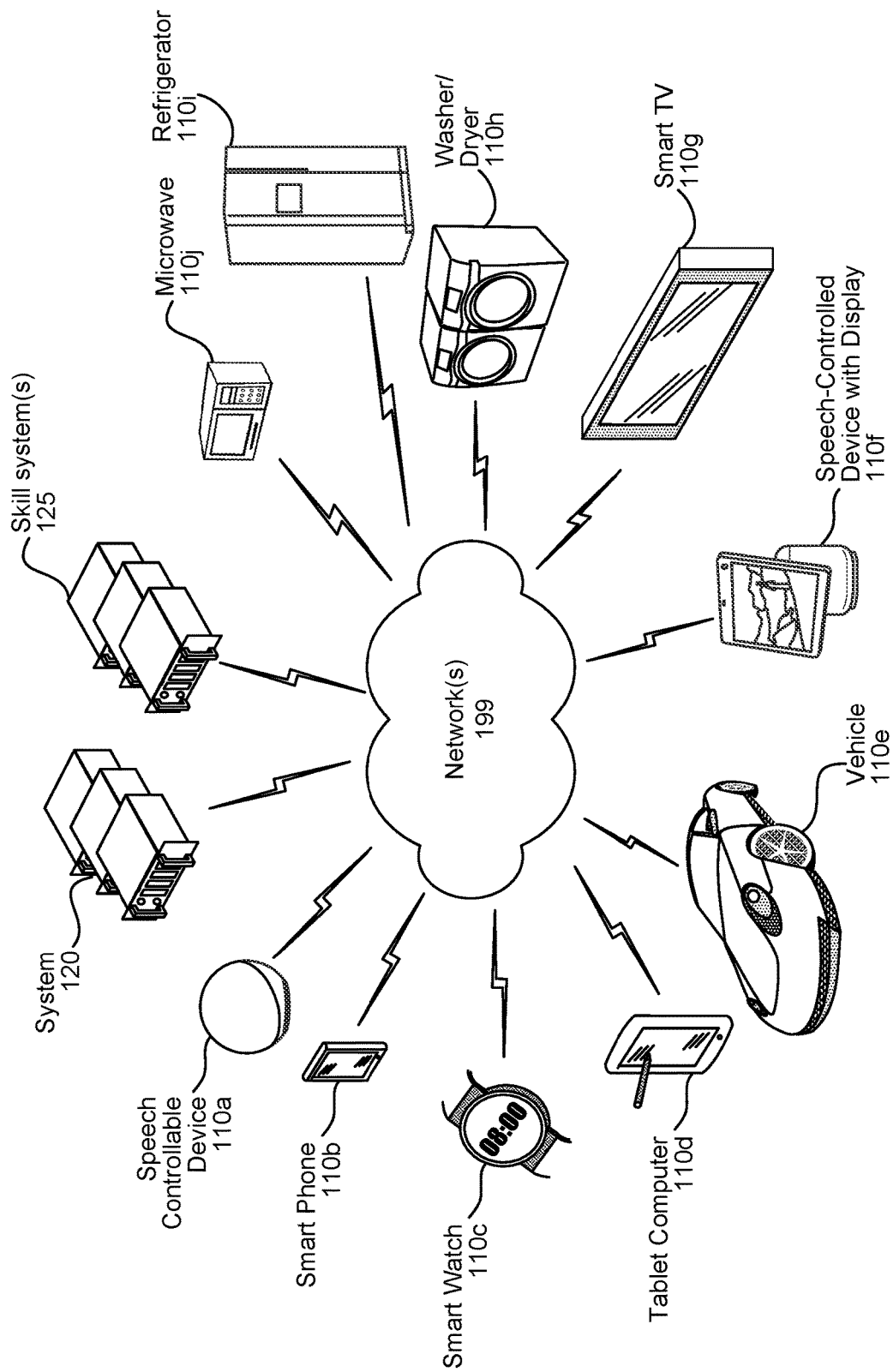
FIG. 11 illustrates an example of a computer network for use with the overall system, according to embodiments of the present disclosure.

The search skill component 190*a* may enable the user 105 to resume a prior search experience at the device 110 or another device, shown in FIG. 11, associated with the user 105 (which may have access to the profile storage 170 or the search session storage). The system may save the search session data as described above. Sometime after the current dialog session ends, the user 105 may provide an input indicating the user 105 wants to resume a prior search session. For example, the user 105 may say "Go back to my search results for [product]", "Resume my search from yesterday", or the like. Alternatively, the user 105 may select an icon and/or text, displayed at the screen of the device 110, corresponding to a prior search session to resume that search session. Such inputs may be routed to the search skill component 190*a*, which may retrieve the search session data corresponding to the indicated search session. In response to the user input, the search skill component 190*a* may display the latest item result(s) that was shown to the user 105 during the indicated search session. Alternatively or additionally, the search skill component 190*a* may cause the device 110 (or the other device) to output text or synthesized speech, which may request confirmation from the user 105 that this is the search session the user wants to resume, may ask the user 105 which item result(s) the user wants to view, may inform the user 105 that item results are being displayed, etc.

Another action that may be supported by the search skill component 190*a* may involve printing an item result(s) or sending an item result(s) to another device (e.g., a smartphone, a computer, etc.). The user 105 may provide an input indicating the user wants to print or send a particular item result. For example, the user 105 may say "print this", "email me this recipe", etc. Alternatively, the user 105 may select an icon and/or text, displayed at the screen of the device 110, enabling the user to print or send the corresponding item result. The navigation component 336 may determine which item result the user 105 is referring to. In response to receiving an input to print an item result, the search skill component 190*a* may cause a printer associated with the profile identifier of the user 105 (in the profile storage 170) to print information corresponding to the indicated item result. In response to receiving an input to send an item result, the search skill component 190*a* may prepare and send a message (e.g., an email message, a SMS, a notification, etc.) to a device associated with the profile identifier of the user 105.

FIG. 6 conceptually illustrates the types of data that may be included in the dialog context data 308, which may be processed by the search skill component 190*a*. In some embodiments, all types of data may be inputted into a single encoder 620. In other embodiments, each type of data may be inputted into a separate different encoder 620. The output of the encoder(s) 620 (e.g., encoded data) may be stored as the dialog context data 308.

In example embodiments, the encoder(s) 620 may take as input a word sequence of L length, and project the word sequence to an F-dimensional vector, where F may be a configurable length. The encoder(s) 620 may output vectors of the same length regardless of the length of input word sequence. The output vector of the encoder(s) 620 may also be referred to as an embedding or a word embedding. The encoder(s) 620 may be a recurrent neural network, LSTM, or other type of ML model.

One type of data included in the dialog context data 308 may be previous user input data 602, which may correspond to one or more user inputs of previous turns of the dialog session (i.e. turns that took place before the current turn of the dialog session). The previous user input data 602 may be text data, token data, or ASR data corresponding to the user input. The previous user input data 602 may be a matrix, where each row (or column) may correspond to a different previous turn of the dialog session. The previous user input data 602 may also include a turn identifier to identify which turn of the dialog session the user input corresponds to.

The dialog context data 308 may further include previous item results 604, which may correspond to one or more item results presented during the previous turns of the dialog session. The previous item results may be represented as text data identifying a title of the item result, a type of the item result (e.g., website, news article, a product, a recipe, etc.), and a data source from which the item result was retrieved. The previous item results data 604 may also include a turn identifier to identify which turn of the dialog session the item results correspond to.

The dialog context data 308 may also include previous suggested user input data 606, which may correspond to one or more suggested user inputs presented during the previous turns of the dialog session. The previous suggested user inputs may be represented as text data or token data. The previous suggested user input data 606 may be a matrix, where each row (or column) may correspond to a different previous turn of the dialog session. The previous suggested user input data 606 may also include a turn identifier to identify which turn of the dialog session the suggested user input corresponds to.

Another type of data included in the dialog context data 308 may be previous user selected item results data 608, which may correspond to one or more item results selected by the user during one or more previous turns of the dialog session. A user may select an item result to receive more information corresponding to the item result, ask a question related to the item result, or request item results similar to the item result. The previous user selected item results may be represented as text data identifying a title of the item result, a type of the item result (e.g., website, news article, a product, a recipe, etc.), and a data source from which the item result was retrieved. The previous user selected item results data 608 may further indicate a type of action performed with respect to the selected item result (e.g., request more information, ask a question, or request similar item results). The previous user selected item results data 608 may also include a turn identifier to identify which turn of the dialog session the item results correspond to.

The dialog context data 308 may also include previous entities data 610, which may correspond to one or more entities corresponding to the user inputs of the previous turns. The previous entities data 610 may also include an entity type corresponding to each of the entities. The previous entities data 610 may also include a turn identifier to identify which turn of the dialog session the entities correspond to.

The dialog context data 308 may also include previous action data 610, which may correspond to one or more system actions of the previous turns of the dialog session. The previous action data 612 may be text data corresponding to a natural language output presented by the system in response to a user input. The previous action data 612 may additionally or alternatively be data representing an API call, inputs used for the API call, and/or the output of the API call. The previous action data 612 may be a matrix where each row (or column) may correspond to a different previous turn of the dialog session. The previous action data 612 may also include a turn identifier to identify which turn of the dialog session the entities correspond to.

Figure 7A:
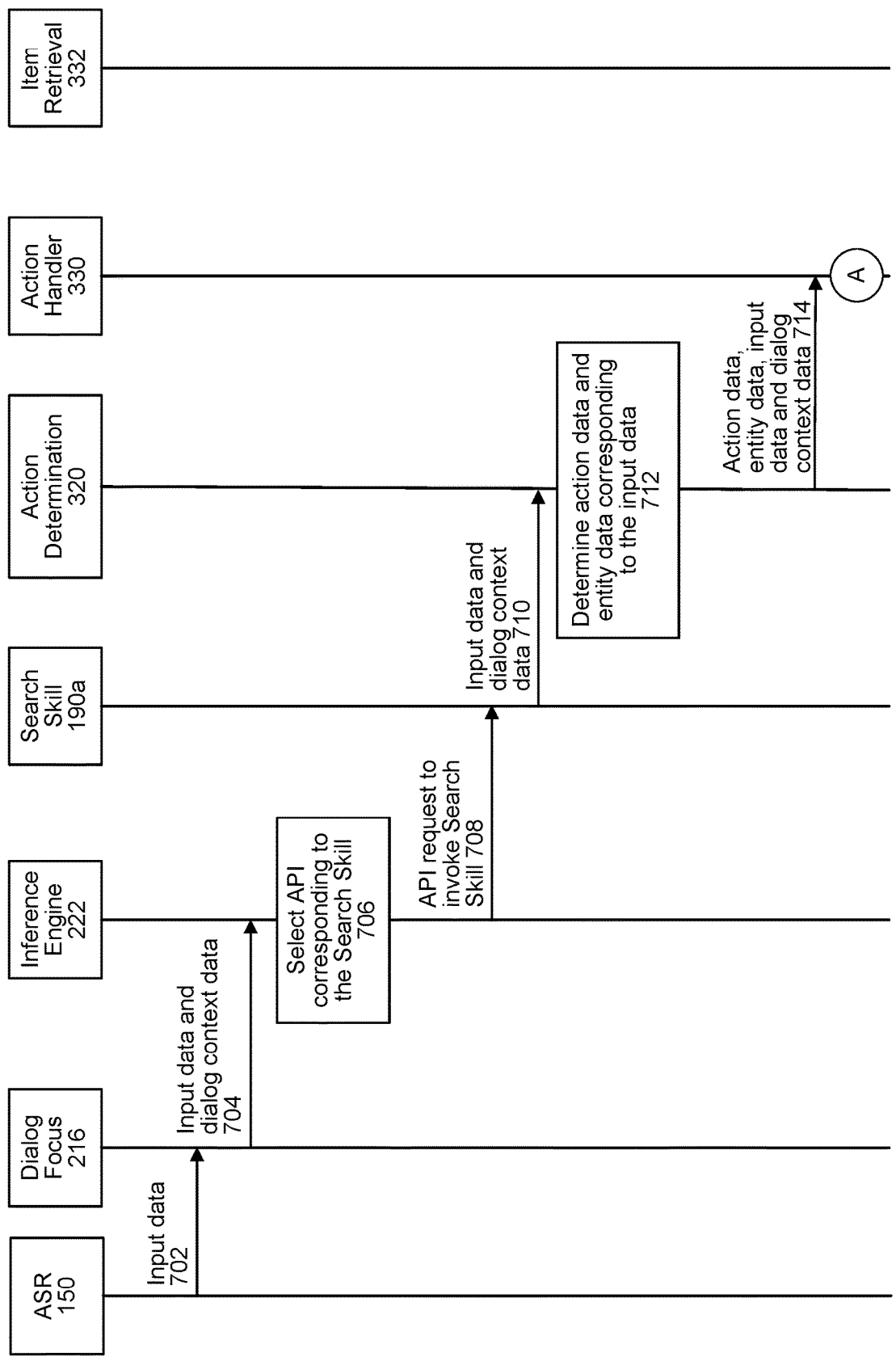
Figure 7C:
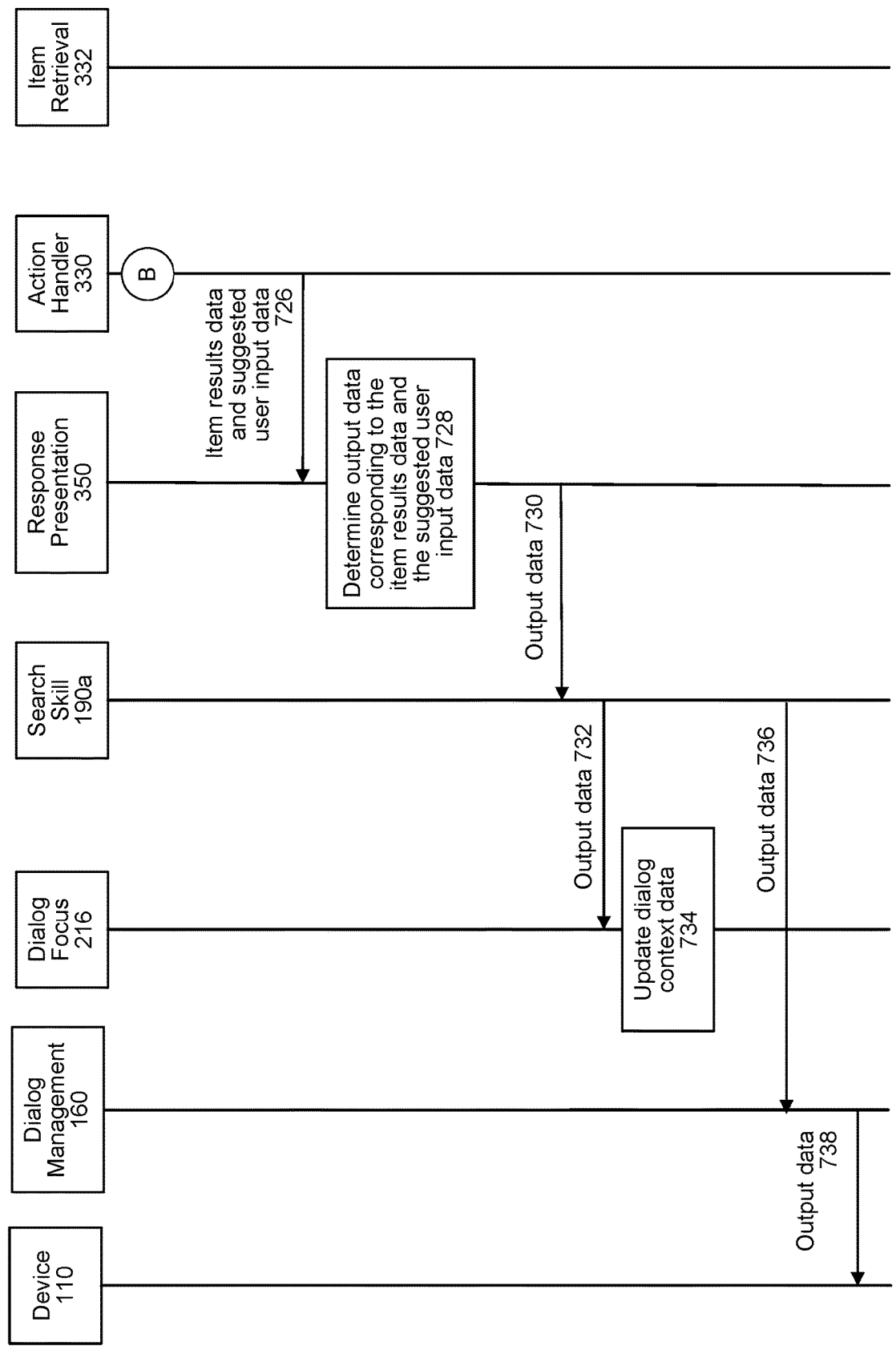

FIGS. 7A-7C are signal flow diagrams illustrating processing that may be performed by the system 100, according to the embodiments of the present disclosure. Referring to FIG. 7A, the ASR component may send (702) input data to the dialog focus component 216. The input data may be ASR data corresponding to a first spoken user input provided by the user 105 and captured by the device 110. The dialog focus component 216 may determine dialog context data for the current dialog session, and may send (704) the input data and the dialog context data to the inference engine 222. The inference engine may select (706) an API corresponding to the search skill component 190a based on the input data and the dialog context data. The inference engine 222 may send (708) an API request to invoke the search skill component 190a. The API request may include the input data and the dialog context data. The search skill component 190a may send (710) the input data and the dialog context data to the action determination component 320. The action determination component 320 may determine (712) action data and entity data corresponding to the input data. The action determination component 320 may send (714) the action data, the entity data, the input data and the dialog context data to the action handler component 330.

Referring to FIG. 7B, the action handler component 330 may determine (716) to invoke the item retrieval component 332. In some cases, the action handler component 330 may invoke other components as described above in relation to FIGS. 3-4. The action handler component 330 may send (718) an API request to search for item results corresponding to the entity data to the item retrieval component 332. In some cases, the item retrieval component 332 may also receive the input data, the action data and the dialog context data. The item retrieval component 332 may send (720) item results data corresponding to the entity data to the action handler component 330. The action handler component 330 may send (722) the input data, the dialog context data, the action data, the entity data and the item results data to the suggested user input component 340. The suggested user input component 340 may determine suggested user input data (as described above in relation to FIG. 5) and may send (724) the suggested user input data to the action handler component 330.

Referring to FIG. 7C, the action handler component 330 may send (726) item results data and suggested user input data to the response presentation component 350. The response presentation component 350 may determine (728) output data corresponding to the item results data and the suggested user input data, and may send (730) the output data to the search skill component 190a. The search skill component 190a may send (732) the output data to the dialog focus component 216, which in turn may update the dialog context data (734) for the current dialog session using the received output data. The search skill component 190a may also send (736) the output data to the dialog management component 160. The dialog management component 160 may send (738) output data, to the device 110, based on the output data received from the search skill component 190a.

The signal flows of FIGS. 7A-7C are exemplary, and other embodiments may involve sending of data from and to other components described in relation to FIGS. 2-5, and may involve sending of data in a different order than shown.

Techniques described herein relate to a user engaging in a dialog session with the system 120, and the search skill component 190a presenting system responses along with suggested user inputs. In other embodiments, the search skill component 190a may provide suggested user inputs to other systems or components for output, that may not be part of a dialog session. For example, the search skill component 190a may provide suggested user inputs to a supplemental content system configured to present supplemental content to a user along with a response to a user input. The supplemental content may content that is unresponsive or not explicitly requested by a user.

The system 120 may use other components illustrated in FIG. 1. The various components shown in FIG. 1 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 820 (shown in FIG. 8). The wakeword detection component 820 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 820 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 820 detects a wakeword, the device 110 may "wake" and begin transmitting audio data 811, representing the audio, to the system 120. The audio data 811 may include the detected wakeword, or the device 110 may remove the portion of the audio data, corresponding to the detected wakeword, prior to sending the audio data 811 to the system 120.

Referring to FIG. 1, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 811 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the dialog management component 160.

In some embodiments, the system 120 may include an NLU component, and the orchestrator 130 may send the ASR output data to the NLU component. The NLU component processes the ASR output data or text data to determine one or more NLU hypotheses embodied in NLU output data. The NLU component may perform intent classification (IC) processing on the ASR output data or text data to determine an intent of the natural language input. An intent corresponds to an action to be performed that is responsive to the natural language input. To perform IC processing, the NLU component may communicate with a database of words linked to intents. For example, a music intent database may link words and phrases such as "quiet," "volume off," and "mute" to a <Mute> intent. The NLU component identifies intents by comparing words and phrases in ASR output data or text data to the words and phrases in an intents database. In some embodiments, the NLU component may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component may be linked to one or more grammar frameworks with entity types to be populated with entity values. Each entity type of a grammar framework corresponds to a portion of ASR output data or text data that the NLU component believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component may perform NER processing to identify words in ASR output data or text data as subject, object, verb, preposition, etc. based on grammar rules and/or models. Then, the NLU component may perform IC processing using the identified verb to identify an intent. Thereafter, the NLU component may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component may generate NLU output data including one or more NLU hypotheses, with each NLU hypothesis including an intent and optionally one or more entity types and corresponding entity values. In some embodiments, the NLU component may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component). In at least some embodiments, the system 120 may implement a spoken language understanding (SLU) component configured to process audio data 811 to determine NLU output data.

The SLU component may be equivalent to a combination of the ASR component 150 and the NLU component. Yet, the SLU component may process audio data 811 and directly determine the NLU output data, without an intermediate step of generating ASR output data. As such, the SLU component may take audio data 811 representing a spoken natural language input and attempt to make a semantic interpretation of the spoken natural language input. That is, the SLU component may determine a meaning associated with the spoken natural language input and then implement that meaning. For example, the SLU component may interpret audio data 811 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to perform one or more actions in response to user inputs processed by the dialog management component 160.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 811. The user recognition component 195 may perform user recognition by comparing speech characteristics, in the audio data 811, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 8:
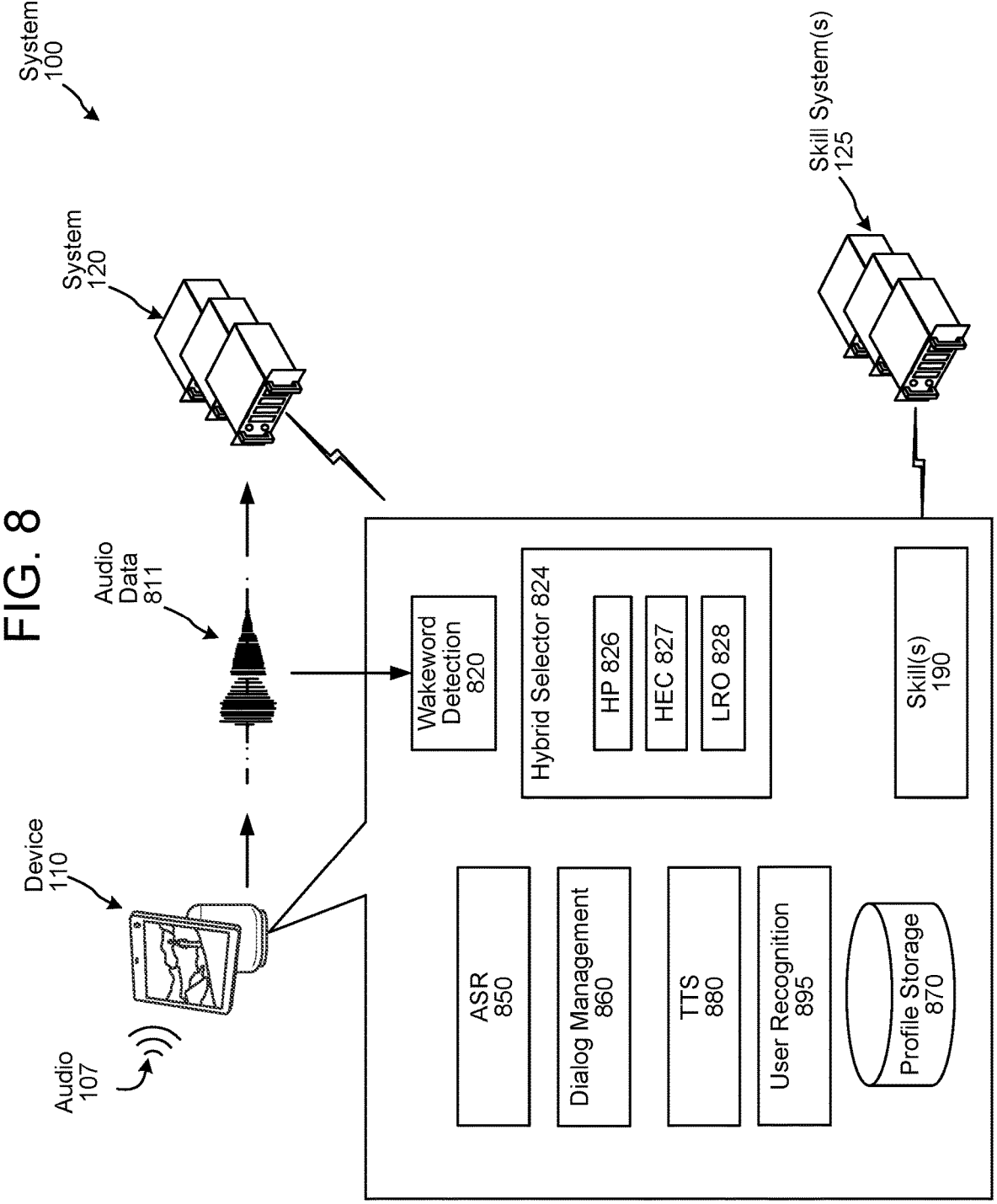
FIG. 8 is a conceptual diagram illustrating components that may be included in a device, according to embodiments of the present disclosure.

The foregoing describes illustrative components and processing of the system 120. The following describes illustrative components and processing of the device 110. As illustrated in FIG. 8, in at least some embodiments the system 120 may receive audio data 811 from the device 110, to recognize speech corresponding to a spoken natural language in the received audio data 811, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 820 configured to detect a wakeword (e.g., "Alexa") that indicates to the device 110 that the audio data 811 is to be processed for determining NLU output data. In at least some embodiments, a hybrid selector 824, of the device 110, may send the audio data 811 to the wakeword detection component 820. If the wakeword detection component 820 detects a wakeword in the audio data 811, the wakeword detection component 820 may send an indication of such detection to the hybrid selector 824. In response to receiving the indication, the hybrid selector 824 may send the audio data 811 to the system 120 and/or an on-device ASR component 850. The wakeword detection component 820 may also send an indication, to the hybrid selector 824, representing a wakeword was not detected. In response to receiving such an indication, the hybrid selector 824 may refrain from sending the audio data 811 to the system 120, and may prevent the ASR component 850 from processing the audio data 811. In this situation, the audio data 811 can be discarded.

The device 110 may conduct its own speech processing using on-device language processing components (such as an on-device SLU component, an on-device ASR component 850, and/or an on-device NLU component) similar to the manner discussed above with respect to the system-implemented ASR component 150, and NLU component. The device 110 may also internally include, or otherwise have access to, other components such as one or more skills 190, a user recognition component 895 (configured to process in a similar manner to the system-implemented user recognition component 195), profile storage 870 (configured to store similar profile data to the system-implemented profile storage 170), a TTS component 880 (configured to process in a similar manner to the system-implemented TTS component 180), and other components. In at least some embodiments, the on-device profile storage 870 may only store profile data for a user or group of users specifically associated with the device 110.

The device 110 may also include a dialog management component 860 that may be configured to perform operations similar to the dialog management component 160, may include similar components to the dialog management component 160 described above, and may be personalized for the user 105 of the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 824, of the device 110, may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 811 to pass to the system 120 while also receiving (e.g., intercepting) this audio data 811 and sending the audio data 811 to the HEC 827.

In at least some embodiments, the hybrid selector 824 may further include a local request orchestrator (LRO) 828 configured to notify the ASR component 850 about the availability of the audio data 811, and to otherwise initiate the operations of on-device language processing when the audio data 811 becomes available. In general, the hybrid selector 824 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 811 is received, the HP 826 may allow the audio data 811 to pass through to the system 120 and the HP 826 may also input the audio data 811 to the ASR component 850 by routing the audio data 811 through the HEC 827 of the hybrid selector 824, whereby the LRO 828 notifies the on-device ASR component 850 of the audio data 811. At this point, the hybrid selector 824 may wait for response data from either or both the system 120 and/or the on-device language processing components. However, the disclosure is not limited thereto, and in some examples the hybrid selector 824 may send the audio data 811 only to the on-device ASR component 850 without departing from the disclosure. For example, the device 110 may process the audio data 811 on-device without sending the audio data 811 to the system 120.

The ASR component 850 is configured to receive the audio data 811 from the hybrid selector 824, and to recognize speech in the audio data 811, and the on-device NLU component is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component) may be selected as usable to respond to a natural language input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 811 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
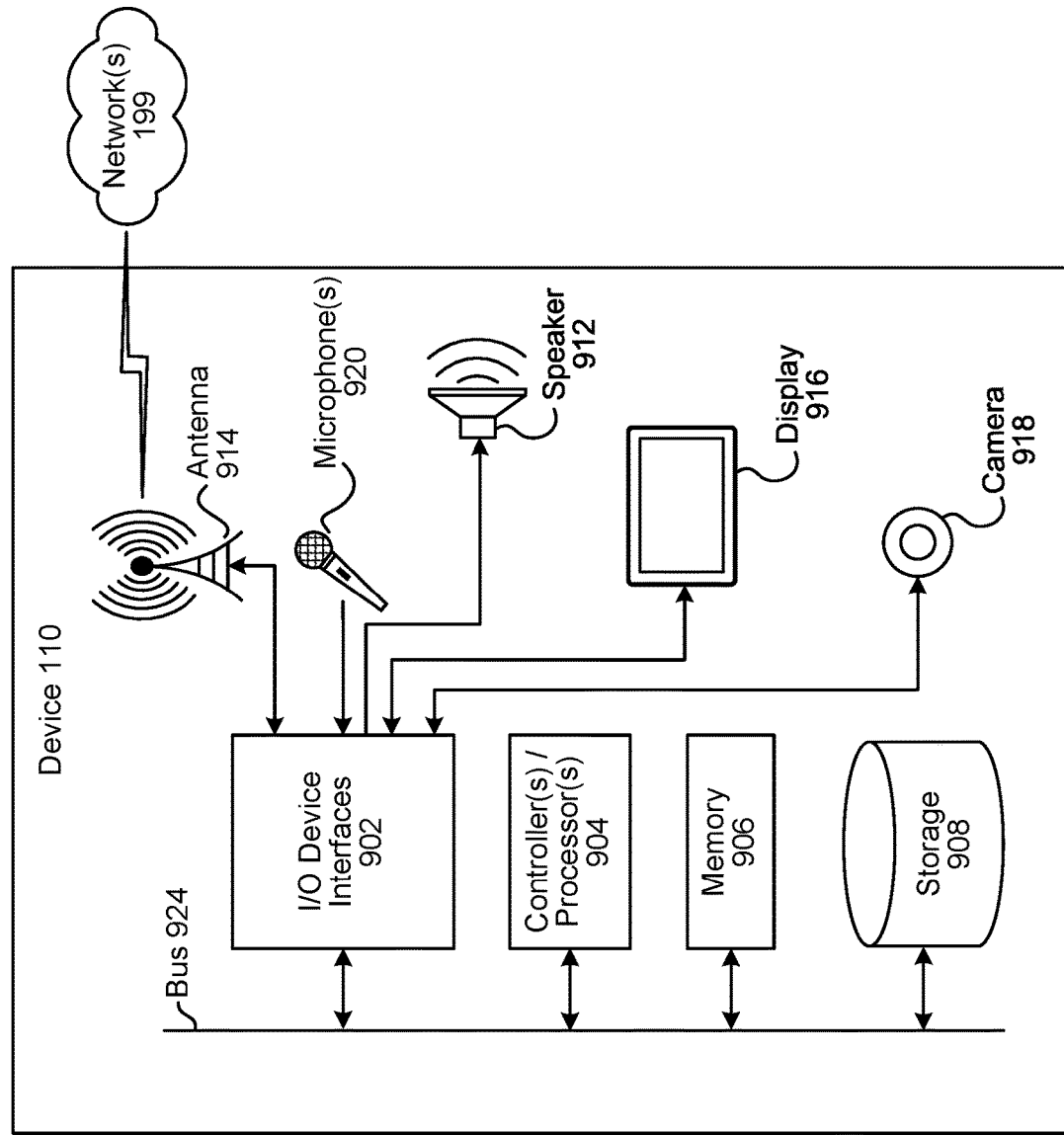
FIG. 9 is a block diagram conceptually illustrating example components of a device, according to embodiments of the present disclosure.
Figure 10:
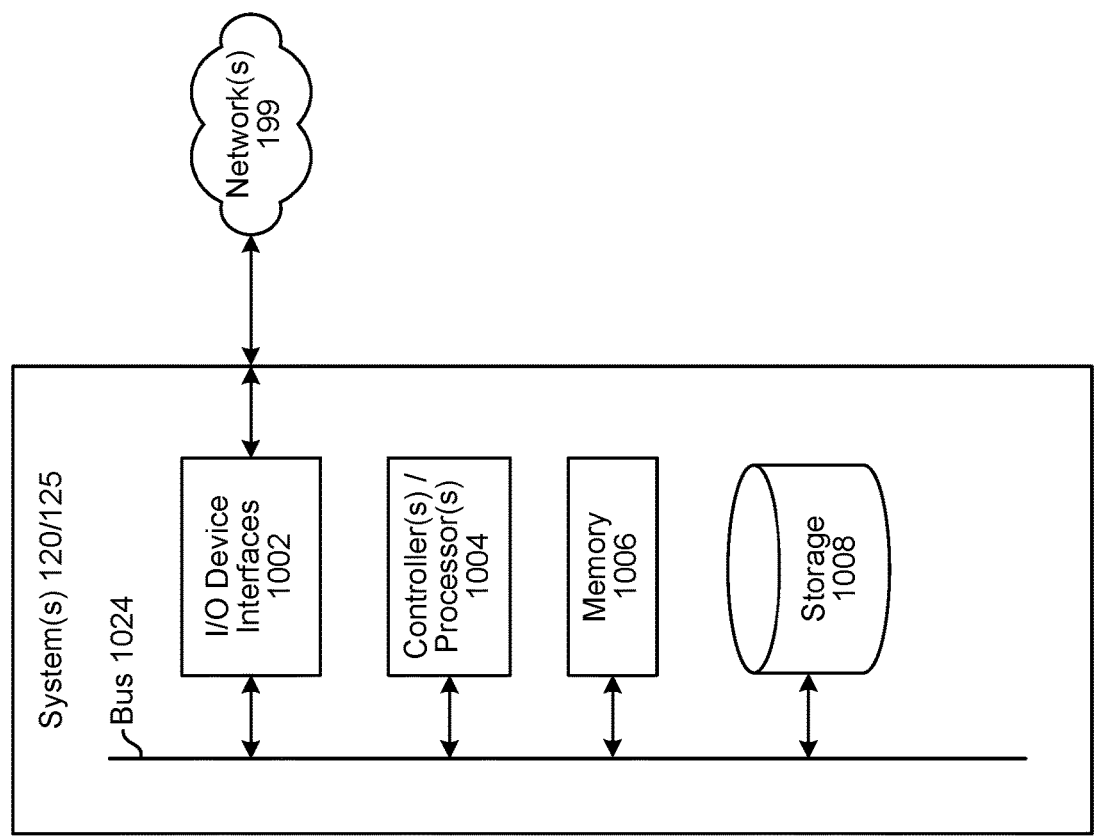
FIG. 10 is a block diagram conceptually illustrating example components of a system, according to embodiments of the present disclosure.

FIG. 9 is a block diagram conceptually illustrating a device 110 of the system 100. FIG. 10 is a block diagram conceptually illustrating example components of a system, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120 and/or skill 125 may include their own dedicated processors, memory, and/or storage. Alternatively, one or more of the components of the device 110, the system 120 and/or skill 125 may utilize the I/O interfaces (902/1002), processor(s) (904/1004), memory (906/1006), and/or storage (908/1008) of the device 110, the system 120 and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120 and the skill system 125, as described herein, are illustrative, and may be located as a stand-alone device or may be included, in whole or in part, as a component of a larger device or system.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, first audio data corresponding to a first spoken input;
   determining that the first spoken input requests information corresponding to a first entity;
   sending, to an item retrieval component, a first request to search for items corresponding to the first entity;
   in response to the first request, receiving, from the item retrieval component, a plurality of item results;
   determining a first attribute corresponding to a first subset of item results from the plurality of item results;
   determining, based on the first attribute, a second spoken input to be provided by a user to request to view the first subset of item results;
   based on determining the second spoken input, determining first data responsive to the second spoken input, wherein the first data is determined based on the first subset of item results;
   in response to the first spoken input, sending, to the device, a second subset of item results from the plurality of item results;
   after determining the first data, sending, to the device, a representation of the second spoken input;
   after sending the representation of the second spoken input and after determining the first data, receiving, from the device, second audio data corresponding to the second spoken input; and
   in response to the second audio data corresponding to the second spoken input, sending, to the device, the first data.

2. The computer-implemented method of claim 1, further comprising:
   processing the first subset of item results to determine content corresponding to a second entity represented in at least one of the second subset of item results;
   determining a third spoken input to be provided by a user to request the content corresponding to the second entity;
   sending, to the device, a representation of the third spoken input;
   receiving, from the device, third audio data corresponding to the third spoken input; and
   in response to the third audio data corresponding to the third spoken input, sending, to the device, output data representing the content corresponding to the second entity.

3. The computer-implemented method of claim 1, further comprising:
receiving, from the device, third audio data corresponding to a third spoken input;
determining that the third spoken input requests information corresponding to a first item result of the first subset of item results;
sending, to a question answering component, a second request to search for information corresponding to the first item result;
in response to the second request, receiving, from the question answering component, output data representing information corresponding to the first item result; and
sending, to the device, the output data in response to the third spoken input.

4. The computer-implemented method of claim 3, further comprising:
determining dialog context data indicating:
output of the second subset of item results,
output of the representation of the second spoken input,
output of the first data, and
user selection of the first item result;
determining, based at least in part on the dialog context data indicating the first data, a second attribute, different that the first attribute, corresponding to a third subset of item results from the plurality of item results;
determining a fourth spoken input corresponding to performance of an action related to the third subset of item results; and
sending, to the device, second output data including a representation of the fourth spoken input.

5. A computer-implemented method comprising:
receiving first input data corresponding to a first natural language input, the first natural language input associated with a dialog session identifier, the first natural language input requesting information corresponding to a first entity;
receiving dialog context data associated with the dialog session identifier, the dialog context data corresponding to at least one input received prior to the first natural language input and a system response corresponding to the at least one input;
determining a plurality of item results corresponding to the first entity;
determining, based at least in part on the plurality of item results and the dialog context data, first natural language data representing a first action with respect to at least one of the plurality of item results;
storing first output data corresponding to performance of the first action, the first output data being responsive to a subsequent user input corresponding to the first natural language data, wherein the first output data is determined based on the plurality of item results;
after storing the first output data, presenting the plurality of item results and a representation of the first natural language data in response to receiving the first input data;
receiving, after storing the first output data and after presenting the plurality of item results and the representation of the first natural language data, second input data including a second natural language input corresponding to the first natural language data; and
in response to the second input data including the second natural language input corresponding to the first natural language data, presenting the first output data.

6. The computer-implemented method of claim 5, further comprising:
determining user profile data corresponding to the first input data;
determining, based at least in part on the user profile data, a first subset of item results, from the plurality of item results, to be presented in response to the first natural language input; and
determining a second subset of item results using the plurality of item results and based on performance of the first action,
wherein presenting the plurality of item results comprises presenting the first subset of item results, and
wherein presenting the first output data comprises presenting the second subset of item results.

7. The computer-implemented method of claim 5, further comprising:
processing the plurality of item results to determine content corresponding to a second entity represented in at least one of the plurality of item results; and
determining the first natural language data to correspond to a request for the content corresponding to the second entity,
wherein the first output data includes the content corresponding to the second entity.

8. The computer-implemented method of claim 5, further comprising:
receiving third input data corresponding to a third natural language input;
determining, using the third input data, that the third natural language input requests information corresponding to a first item result of the plurality of item results;
sending, to a first component, a request to search for information corresponding to the first item result;
in response to the request, receiving, from the first component, second output data representing information corresponding to the first item result;
determining second natural language data corresponding to performance of a second action;
presenting, in response to the third natural language input, the second output data; and
presenting a representation of the second natural language data.

9. The computer-implemented method of claim 8, further comprising:
determining the dialog context data to indicate:
output of the plurality of item results,
output of the representation of the first natural language data, and
user selection of the first item result.

10. The computer-implemented method of claim 5, further comprising:
sending, to an item retrieval component, a first request to search for item results corresponding to the first entity;
in response to the first request, receiving, from the item retrieval component, a first set of item results;
sending, to a question answering component, a second request to search for information corresponding to the first entity;
in response to the second request, receiving, from the question answering component, a second set of item results; and
determining the plurality of item results using the first set of item results and the second set of item results.

11. The computer-implemented method of claim 5, further comprising:

receiving third input data corresponding to a third natural language input;

determining, using the third input data, that the third natural language input requests viewing of a first item result of the plurality of item results;

based on content included in the first item result, determining second natural language data corresponding to a fourth natural language input to be provided by a user; and presenting second output data corresponding to the first item result and a representation of the second natural language data.

12. The computer-implemented method of claim 5, further comprising:

determining an attribute corresponding to the plurality of item results;

determining the first natural language data representing the first action being viewing of a first subset of item results of the plurality of item results, wherein the first subset of item results corresponds to the attribute; and storing the first output data including the first subset of item results.

13. A system comprising:

at least one processor; and at least one memory including instructions that, when executed by the at least one processor, cause the system to:

receive first input data corresponding to a first natural language input, the first natural language input associated with a dialog session identifier, the first natural language input requesting information corresponding to a first entity;

receive dialog context data associated with the dialog session identifier, the dialog context data corresponding to at least one input received prior to the first natural language input and a system response corresponding to the at least one input;

determine a plurality of item results corresponding to the first entity;

determine, based at least in part on the plurality of item results and the dialog context data, first natural language data representing a first action with respect to at least one of the plurality of item results;

store first output data corresponding to performance of the first action, the first output data being responsive to a subsequent user input corresponding to the first natural language data, wherein the first output data is determined based on the plurality of item results;

after storing the first output data, present the plurality of item results and a representation of the first natural language data in response to receiving the first input data;

receive, after storing the first output data and after presenting the plurality of item results and the representation of the first natural language data, second input data including a second natural language user input corresponding to the first natural language data; and in response to the second input data including the second natural language user input corresponding to the first natural language data, present the first output data.

14. The system of claim 13, wherein the at least one memory includes further instructions that, when executed by the at least one processor, further cause the system to:

determine user profile data corresponding to the first input data;

determine, based at least in part on the user profile data, a first subset of item results from the plurality of item results to be presented in response to the first natural language input;

determine a second subset of item results using the plurality of item results and based on performance of the first action;

present the first subset of item results in response to the first natural language input, and present the first output data including the second subset of item results.

15. The system of claim 13, wherein the at least one memory includes further instructions that, when executed by the at least one processor, further cause the system to:

process the plurality of item results to determine content corresponding to a second entity represented in at least one of the plurality of item results; and determine the first natural language data to correspond to a request for the content corresponding to the second entity, wherein the first output data includes the content corresponding to the second entity.

16. The system of claim 13, wherein the at least one memory includes further instructions that, when executed by the at least one processor, further cause the system to:

receive third input data corresponding to a third natural language input;

determine, using the third input data, that the third natural language input requests information corresponding to a first item result of the plurality of item results;

send, to a first component, a request to search for information corresponding to the first item result;

in response to the request, receive, from the first component, second output data representing information corresponding to the first item result;

determine second natural language data corresponding to performance of a second action;

present, in response to the third natural language input, the second output data; and present a representation of the second natural language data.

17. The system of claim 16, wherein the at least one memory includes further instructions that, when executed by the at least one processor, further cause the system to:

determine the dialog context data to indicate:
output of the plurality of item results,
output of the representation of the first natural language data, and
user selection of the first item result.

18. The system of claim 13, wherein the at least one memory includes further instructions that, when executed by the at least one processor, further cause the system to:

send, to an item retrieval component, a first request to search for item results corresponding to the first entity;

in response to the first request, receive, from the item retrieval component, a first set of item results;

send, to a question answering component, a second request to search for information corresponding to the first entity;

in response to the second request, receive, from the question answering component, a second set of item results; and determine the plurality of item results using the first set of item results and the second set of item results.

19. The system of claim 13, wherein the at least one memory includes further instructions that, when executed by the at least one processor, further cause the system to:

receive third input data corresponding to a third natural language input;

determine, using the third input data, that the third natural language input requests viewing of a first item result of the plurality of item results;

based on content included in the first item result, determine second natural language data corresponding to a fourth natural language input to be provided by a user; and present second output data corresponding to the first item result and a representation of the second natural language data.

20. The system of claim 13, wherein the at least one memory includes further instructions that, when executed by the at least one processor, further cause the system to:

determine an attribute corresponding to the plurality of item results;

determine the first natural language data representing the first action being viewing of a first subset of item results of the plurality of item results, wherein the first subset of item results corresponds to the attribute; and store the first output data including the first subset of item results.

\* \* \* \* \*